US008824546B2

(12) United States Patent
Coulombe et al.

(10) Patent No.: US 8,824,546 B2
(45) Date of Patent: Sep. 2, 2014

(54) BUFFER BASED RATE CONTROL IN VIDEO CODING

(75) Inventors: Stéphane Coulombe, Brossard (CA); Francis Labonte, Sherbrooke (CA)

(73) Assignee: Vantrix Corporation, Montreal (CA)

( * ) Notice: Subject to any disclaimer, the term of this patent is extended or adjusted under 35 U.S.C. 154(b) by 1050 days.

(21) Appl. No.: 12/601,267

(22) PCT Filed: Jun. 19, 2008

(86) PCT No.: PCT/CA2008/001168
§ 371 (c)(1),
(2), (4) Date: Mar. 30, 2010

(87) PCT Pub. No.: WO2008/154742
PCT Pub. Date: Dec. 24, 2008

(65) Prior Publication Data
US 2010/0195713 A1 Aug. 5, 2010

Related U.S. Application Data

(60) Provisional application No. 60/929,255, filed on Jun. 19, 2007.

(51) Int. Cl.
H04N 7/26 (2006.01)
H04N 7/50 (2006.01)

(52) U.S. Cl.
CPC ..... *H04N 19/00163* (2013.01); *H04N 19/0009* (2013.01); *H04N 19/00193* (2013.01); *H04N 19/00921* (2013.01); *H04N 19/00781* (2013.01); *H04N 19/00187* (2013.01); *H04N 19/00157* (2013.01); *H04N 19/0006* (2013.01); *H04N 19/00266* (2013.01); *H04N 19/00909* (2013.01)
USPC ..................................................... 375/240.02

(58) Field of Classification Search
USPC ..................................................... 375/240.02
See application file for complete search history.

(56) References Cited

U.S. PATENT DOCUMENTS 5,717,464 A 2/1998 Perkins
6,141,380 A * 10/2000 Krishnamurthy et al. ........................ 375/240.02

(Continued)

FOREIGN PATENT DOCUMENTS

CA 2264834 1/1999
JP 2005-538606 12/2005
WO WO2008/070987 6/2008

OTHER PUBLICATIONS

"New Rate Control Algorithm", ITU Study Group 16—Video Coding Experts Group—ISO/IEC MPEG & ITU-T VCEG(ISO/IEC JTC1/SC29/WG11 and ITU-T SG16 Q6), No. JVT-E024, Oct. 18, 2002.*

(Continued)

*Primary Examiner* — Mehrdad Dastouri
*Assistant Examiner* — Mohammed Rahaman
(74) *Attorney, Agent, or Firm* — IP-MEX Inc.; Victoria Donnelly

(57) ABSTRACT

A device and method of controlling bitrate in video coding of a sequence of frames including series of Inter frames separated by Intra frames, wherein the coded frames are validated in a video buffering device prior to transmission of the coded frames and wherein the method comprises: measuring frame complexity in the sequence of frames; for each Inter frame, calculating a target buffer level of the video buffering device in relation to a distance between the Inter frame and a next Intra frame; for each Inter frame, calculating a target frame size in relation to the distance between the Inter frame and the next Intra frame, the measured frame complexity, a current buffer level of the video buffering device and the calculated target buffer level of the video buffering device; and using the calculated target frame size to control bitrate in video coding of the sequence of frames.

25 Claims, 6 Drawing Sheets

(56) References Cited

U.S. PATENT DOCUMENTS

| | | | |
|---|---|---|---|
| 6,233,226 B1 | 5/2001 | Gringeri et al. | |
| 6,330,286 B1 | 12/2001 | Lyons et al. | |
| 6,356,309 B1 * | 3/2002 | Masaki et al. | 348/439.1 |
| 6,678,322 B1 | 1/2004 | Mihara | |
| 6,731,685 B1 | 5/2004 | Liu et al. | |
| 7,023,924 B1 | 4/2006 | Keller et al. | |
| 2004/0252758 A1 | 12/2004 | Katsavounidis | |
| 2006/0140270 A1 * | 6/2006 | Li et al. | 375/240.12 |
| 2006/0233236 A1 * | 10/2006 | Labrozzi et al. | 375/240.03 |
| 2007/0009025 A1 | 1/2007 | Kwon et al. | |
| 2007/0153916 A1 | 7/2007 | Demircin et al. | |

OTHER PUBLICATIONS

"A Sequence-Based Rate Control Framework for Consistent Quality Real-Time Video", IEEE Transactions on Circuits and Systems for Video Technology, IEEE Service Center, Piscataway, NJ, US, vol. 16, No. 1, Jan. 1, 2006 pp. 56-71.*

Song, H. et al. "Rate Control for Low-Bit-Rate Video via Variable-Encoding Frame Rates" IEEE Transactions on Circuits and Systems for Video Technology, vol. 11, No. 4, Apr. 2001.

Lee, Hung-Ju et al. "Scalable Rate Control for MPEG-4 Video" IEEE Transactions on Circuits and Systems for Video Technology, vol. 10 No. 6, Sep. 2000.

Zhengguo Li, Feng Pan, Genan Feng, Kengpang Lim, Xiao Lim, Susanto Rahardja "New Rate Control Algorithm" Joint Video Team (JVT) of ISO/IEC MPEG & ITU-T VCEG No. JVT-E024, Oct. 18, 2002.

Jordi Ribas-Corbera, Rate Control in DCT Video Coding for Low-Delay Communications, IEEE Transactions on Circuits and Systems for Video Technology, vol. 9, No. 1, Feb. 1999.

Gallant, Michael, Cote, Guy, Kossentini Faouzi, An Efficient Computation-Constrained Block-Based Motion Estimation Algorithm for Low Bit Rate Video Coding, IEEE Transactions on Image Processing, vol. 8, No. 12, Dec. 1999.

Balm, Mario and Ofec, Joram, End-to-End Delay Analysis of Videoconferencing over Packet-Switched Networks, IEEE Transactions on Networking, vol. 8, No. 4, Aug. 2000.

F.Pan, Z.G.Li, K.P.Lim, X.Lin, S.Rahardga, D.J.Wu and S.Wu, Adaptive Intra-Frame Quantization for Very Low Bit Rate Video Coding, Institute for Infocomm Research, Singapore.

Bo Xie and Wenjun Zeng, A sequence-Based Rate Control Framework for Consistent Quality Real-Time Video, IEEE Transactions on Circuits and Systems for Video Technology, vol. 16, 2006.

Minqiang Jiang and Xiaoquan, Yi, Improved Frame-Layer Rate Control for H.264 Using MAD Ratio, ISCAS 04 Proceedings of the 2004 International Symposium on Circuits and System 2004.

Jyi-Chang Tsai and Chaur-Heh Hgieh, Modified TMN8 Rate Control for Low-Delay Video Communications, IEEE Transactions on Circuits and Systems for Video Technology, vol. 14, No. 6, Jun. 2004.

Hoda, Roodaki, Mahmoud Reza Hashemi, Omid Fatemi, A Frame Layer Bit Allocation for H.264 Based on Frame Complexity, Multimedia Processing Laboratory, Faculty of Electrical and computer Engineering, University of Teheran, Teheran, Iran, IEEE CCECE/CCGEI, Ottawa, May 2006.

Minqiang Jiang and Nam Ling, Low-Delay Rate Control for Real-Time H.264/AVC Video Coding, IEEE Transactions on Multimedia, vol. 8, No. 3, Jun. 2006.

Sullivan, Gary, Draft Text of Recommendation H.263 Version 2 ("H.263+") for Decision, Sep. 25, 1997, ITU.

ITU-T Recommendation H.264, Series H: Audiovisual and Multimedia Systems Infrastructure of audiovisual services—Coding of moving video, Advanced video coding for generic audiovisual services, Mar. 2005.

Alberink, Martin and Iacob, Sorin GigaCE/D1.11 project, Telematica Instituut, Enschede, The Netherlands, Jul. 21, 2001.

"Video Codec Test Model, Near-Term, Version 8 (TMN8) Revision 1" ITU=T Telecommunication Standardization Sector of ITU, Geneva, CH, vol. Q.15116, pp. I-III, 01 XP001074663, Sep. 8, 1997.

Li Z G et al. "A Novel Rate Control Scheme for Video Over Internet" 2002 IEEE International Conference on Acoustics, Speech, and Signal Processing. Proceedings (ICASSP). Orlando, Fl, May 13-17, 2002; (IEEE International Conference on Acoustics, Speech, and Signal Processing(ICASSP)), New York, NY: IEEE, US, vol. 2, pp. II-2065, XP010804307, ISBN: 978-0-7803-7402-7 May 13, 2002.

Chih-Feng Chang et al. "A Stable Buffer Control Strategy for MPEG Coding", IEEE Transactions on Circuits and Systems for Video Technology, IEEE Service Center, Piscataway, NJ, US vol. 7, No. 8 XP011014428, ISSN:1051-8215 Dec. 1, 1997.

* cited by examiner

BUFFER BASED RATE CONTROL IN VIDEO CODING

RELATED APPLICATIONS

The present application claims benefit from the U.S. provisional application Ser. No. 60/929,255 filed on Jun. 19, 2007, entire contents of which are incorporated herein by reference.

FIELD OF THE INVENTION

The present invention generally relates to rate control in video coding. More specifically, but not exclusively, the present invention is concerned with a buffer-based rate control exploiting frame complexity, buffer level and position of intra frames in video coding.

BACKGROUND OF THE INVENTION

The past few years have witnessed a great popularity of digital and online videos and their applications. With the emergence of fast communication technologies and multimedia applications, digital video codecs are used in many areas and systems, such as in DVDs (Digital Video Disc) employing the MPEG-2 (Moving Picture Experts Group-2) format, in VCDs (Video Compact Disc) employing the MPEG-1 (Moving Picture Experts Group-1) format, in emerging satellite and terrestrial broadcast systems, and on the Internet.

More specifically, this popularity of video applications lead to interesting developments in video codecs, which compress and decompress video data. In video data compression, a balance is kept between the video quality and the compression rate, i.e. the necessary transmitted quantity of data or, in other words, the bitrate needed to represent the video.

In addition, the complexity of the encoding and decoding algorithms, the robustness to data losses and errors, the state of the art of compression algorithm design, end-to-end delay in a videoconference application, etc. are also considered.

A plurality of video coding standards exist, each of them being specially designed for a particular type of application. For example, the H.263 standard, published by the ITU (International Telecommunications Union) is a video coding and compression standard for low bitrates, such as in the range of 20-30 kbps (kilobits per second). More specifically, this standard supports video coding in video-conferencing and video-telephony applications.

The H.263 standard specifies the format and content of the encoded stream of data; therefore it sets the requirements for the encoder and decoder to meet without specifically providing a design or structure for the encoder and decoder themselves.

In video compression, each picture is represented by typically two kinds of pictures, commonly referred to as frames, i.e. the Intra frames and Inter frames. Furthermore, the Inter frames are separated into two categories, i.e. the P-frames (Predictive frames) and B-frames (Bi-predictive or Bi-directional frames). An Intra frame represents a whole picture coded independently of any other picture; therefore they are bandwidth consuming since the content of the whole picture must be encoded. In order to compress and therefore save bandwidth, only differences between whole pictures (or Intra frames) are encoded and then transmitted. Those differences are represented by the P-frames and the B-frames. For example, the background between two consecutive pictures usually does not change and, therefore, such background does not need to be encoded again. The B-frames distinguish from the P-frames in that they are bi-directional and thus perform a bi-directional prediction, i.e. a prediction from the previous and next pictures.

Furthermore, when compressing videos, a picture is divided into macroblocks (MB) for processing purposes. Indeed, processing is performed macroblock by macroblock. Each macroblock generally represents a block of 16 by 16 pixels.

A video encoder generally includes a motion estimation module, a motion compensation module, a DCT (Discrete Cosine Transform) module, and a quantizing module.

The motion estimation module allows for predicting which areas of a previous frame have been moved into the current frame so that those areas do not need to be re-encoded.

The motion compensation module allows for compensating for the movement of the areas from the previous frame into the current frame.

DCTs are generally used for transforming a block of pixels into "spatial frequency coefficients". They operate on a two-dimensional block of pixels, such as a macroblock. Since DCTs are efficient at compacting pictures, generally a few DCT coefficients are sufficient for recreating the original picture.

The quantizing module is provided for quantizing the DCT coefficients. For example, the quantizing module sets the near zero DCT coefficients to zero and quantizes the remaining non-zero DCT coefficients.

One of the limitations in video coding comes from the capacity of the communication channels. Indeed, communication channels are limited by the number of bits that they can transmit per second. In many channels, the bitrate is constant, such as in ISDN (Integrated Services Digital Networks), POTS (Plain Old Telephone Service), etc.

However, depending on the efficiency of the algorithms used to compress the videos and the motion complexity of those videos, the bit budget and the bitrate needed for encoding and transmitting encoded videos may vary and, in particular, increase. Therefore rate control is needed so as to adjust the bitrate required for encoding videos of various complexities to the bitrate of the communication channel used to transmit these encoded videos.

The current rate control algorithm used in the H.263 standard is called the TMN8 (Test Model Near-Term version 8). Generally stated, this rate control algorithm ensures that only an average bitrate is met. This algorithm cannot control both an average target bitrate and a maximum bitrate.

The article entitled "*Rate Control in DCT Video Coding for Low-Delay Communications*", by Jordi Ribas-Corbera, 1999, hereinafter referred to as Reference 1, discloses an algorithm used by the rate control TMN8 to ensure that the target average bitrate, related to a target frame size, is met by each frame. More specifically, the TMN8 rate control algorithm computes some image statistics to determine some proper QP (Quantization Parameter) values and update them for each Intra frame so as to meet the target frame size. Unfortunately, this control is very approximate and often the resulting frame size can be significantly larger or smaller than the target frame size.

Furthermore, in the TMN8 rate control algorithm, when the given target bitrate is exceeded, the encoder will skip a certain number of frames so as to compensate for the overflow. Of course, by so doing, the quality of the communication and video is altered.

Another rate control method, such as the maximum birate-based rate control, shows improvements over the TMN8 rate control. The method is described in "*An improved video rate control for video coding standards*", by Stéphane Coulombe, 2007, PCT/CA2007/002242, hereinafter referred to as Reference 2. This maximum bitrate-based rate control method is structured to meet both with average and maximum bitrates. However, this maximum bitrate-based rate control method is derived from the particular definition of the maximum bitrate. More particularly, the maximum bitrate is defined as the maximum amount of bits that can be transmitted within one second. Applications such as video streaming do not follow this definition.

In applications such as video streaming, basic buffer-based rate control methods can be used and show improvements over the TMN8 rate control. Such buffer-based rate control method is presented in Reference 2. A basic buffer-based rate controller allocates a large amount of bits to the Intra frame and then distributes the unused bits from the encoding of the Intra frame over the following Inter frames in order to optimize the size of the video buffering verifier over a certain number of frames. However, even though it was shown that the basic buffer-based rate controller worked well for several video sequences, it exhibited some problems with sequences including many motion and scene changes, such as those found in movie and video trailers. In those sequences, allocating a large amount of bits to or around the Intra frames and allocating a near constant amount of bits to the remaining frames was not a good strategy. The Video Buffer Verifier (VBV) is a model of a hypothetical decoder buffer that should not overflow or underflow when fed with a conforming video bit stream. In the present invention the video buffer verifier will refer to the VBV in the case of MPEG-4 coding (see Annex D of the MPEG-4 video coding standard), the Hypothetical Reference Decoder of H.263 (see Annex B of H.263 standard) or any other buffer model of a hypothetical decoder.

In the article of Bo Xie and Wenjun Zeng entitled "A sequence-based rate control framework for consistent quality real-time video", in the IEEE Transactions on Circuits and Systems for Video Technology, Vol. 16, pp. 56-71, 2006, Xie and Zeng exploit a frame complexity metric, the mean absolute difference (MAD) in a buffer-based video rate controller. Their new rate control framework achieves more consistent quality across video sequences. Their method is a sequence-based (as opposed to GOP (Group of Pictures)-based) bit allocation model to track the non-stationary characteristics in the video source. They showed that their proposed rate control solution can produce significantly better PSNR (Peak Signal-to-Noise Ratio) performance (in terms of both average value and consistency across scenes) as well as temporarily smoother video with less quality flicker and motion jerkiness than MPEG-4 Annex L frame-level rate control. Xie and Zeng claim that their proposed rate control solution is robust against various sequences, bit rates and frame rates, and has been used in commercial products. However, they do not consider the buffer level in their method except from typical checks for buffer overflow and underflow. Not acting based on actual buffer level can lead to an increased number of dropped frames. For instance, when the buffer level is high, the actual coded frame has a greater probability to create an overflow and thus leading to a dropped frame. Xie and Zeng do not use either the position of Intra frames (when they come at regular intervals) nor take into account a maximum bitrate as well as an average bitrate in their rate control method; they consider only a maximum bitrate equal to the average bitrate.

Therefore, there is still a need for overcoming the above discussed problems related to rate control in video sequences including a lot of motion and scene changes. Accordingly, buffer-based device and method capable of improving rate control are sought.

OBJECTS OF THE INVENTION

An object of the present invention is therefore to provide a buffer-based rate control capable of overcoming the above discussed problems. For example, such a buffer-base control will exploit frame complexity, buffer level, position of Intra frames in video coding in order to meet an average as well as a maximum bitrate specification.

SUMMARY OF THE INVENTION

More specifically, in accordance with a first aspect of the present invention, there is provided a method of controlling bitrate in video coding of a sequence of frames including series of Inter frames separated by Intra frames. The coded frames are validated in a video buffering device prior to transmission of the coded frames. The method comprises: measuring frame complexity in the sequence of frames; for each Inter frame, calculating a target buffer level of the video buffering device in relation to a distance between the Inter frame and a next Intra frame; for each Inter frame, calculating a target frame size in relation to the distance between the Inter frame and the next Intra frame, the measured frame complexity, a current buffer level of the video buffering device and the calculated target buffer level of the video buffering device; and using the calculated target frame size to control bitrate in video coding of the sequence of frames.

According to a second aspect of the present invention, there is provided a method of controlling bitrate in video coding of a sequence of frames including series of Inter frames separated by Intra frames to meet with an average bitrate without exceeding a maximum size limit of a video buffering verifier. The video coding comprises validating the coded frames in the video buffering verifier prior to transmission of the coded frames. The method comprises: measuring frame complexity in the sequence of frames; for each Inter frame, calculating a target buffer level of the video buffering verifier in relation to a distance between the Inter frame and a next Intra frame; for each Inter frame, calculating a target frame size in relation to the distance between the Inter frame and the next Intra frame, the measured frame complexity, a current buffer level of the video buffering verifier and the calculated target buffer level of the video buffering verifier; and using the calculated target frame size to meet with the average bitrate without exceeding the maximum size limit of the video buffering verifier in video coding of the sequence of frames.

According to a third aspect of the present invention, there is provided a device for controlling bitrate in video coding of a sequence of frames including series of Inter frames separated by Intra frames. The coded frames are validated in a video buffering device prior to transmission of the coded frames. The device comprises: a detector of frame complexity in the sequence of frames; a first calculator of a target buffer level of the video buffering device, for each Inter frame, in relation to a distance between the Inter frame and a next Intra frame; a second calculator of a target frame size, for each Inter frame, in relation to the distance between the Inter frame and the next Intra frame, the measured frame complexity, a current buffer level of the video buffering device and the calculated target buffer level of the video buffering device; and a control of the bitrate in video coding of the sequence of frames in response to the calculated target frame size.

According to a fourth aspect of the present invention, there is provided a device for controlling bitrate in video coding of a sequence of frames including series of Inter frames separated by Intra frames to meet with an average bitrate without exceeding a maximum size of a video buffering verifier. The video coding comprises validating the coded frames in the video buffering verifier prior to transmission of the coded frames. The device comprises: a detector of frame complexity in the sequence of frames; a first calculator of a target buffer level of the video buffering verifier, for each Inter frame, in relation to a distance between the Inter frame and a next Intra frame; a second calculator of a target frame size, for each Inter frame, in relation to the distance between the Inter frame and the next Intra frame, the measured frame complexity, a current buffer level of the video buffering verifier and the calculated target buffer level of the video buffering verifier; and a control of the bitrate in video coding of the sequence of frames in response to the calculated target frame size to meet with the average bitrate without exceeding the maximum size of the video buffering verifier in video coding of the sequence of frames.

The foregoing and other objects, advantages and features of the present invention will become more apparent upon reading of the following non-restrictive description of illustrative embodiments thereof, given by way of example only with reference to the accompanying drawings.

DETAILED DESCRIPTION

Figure 1:
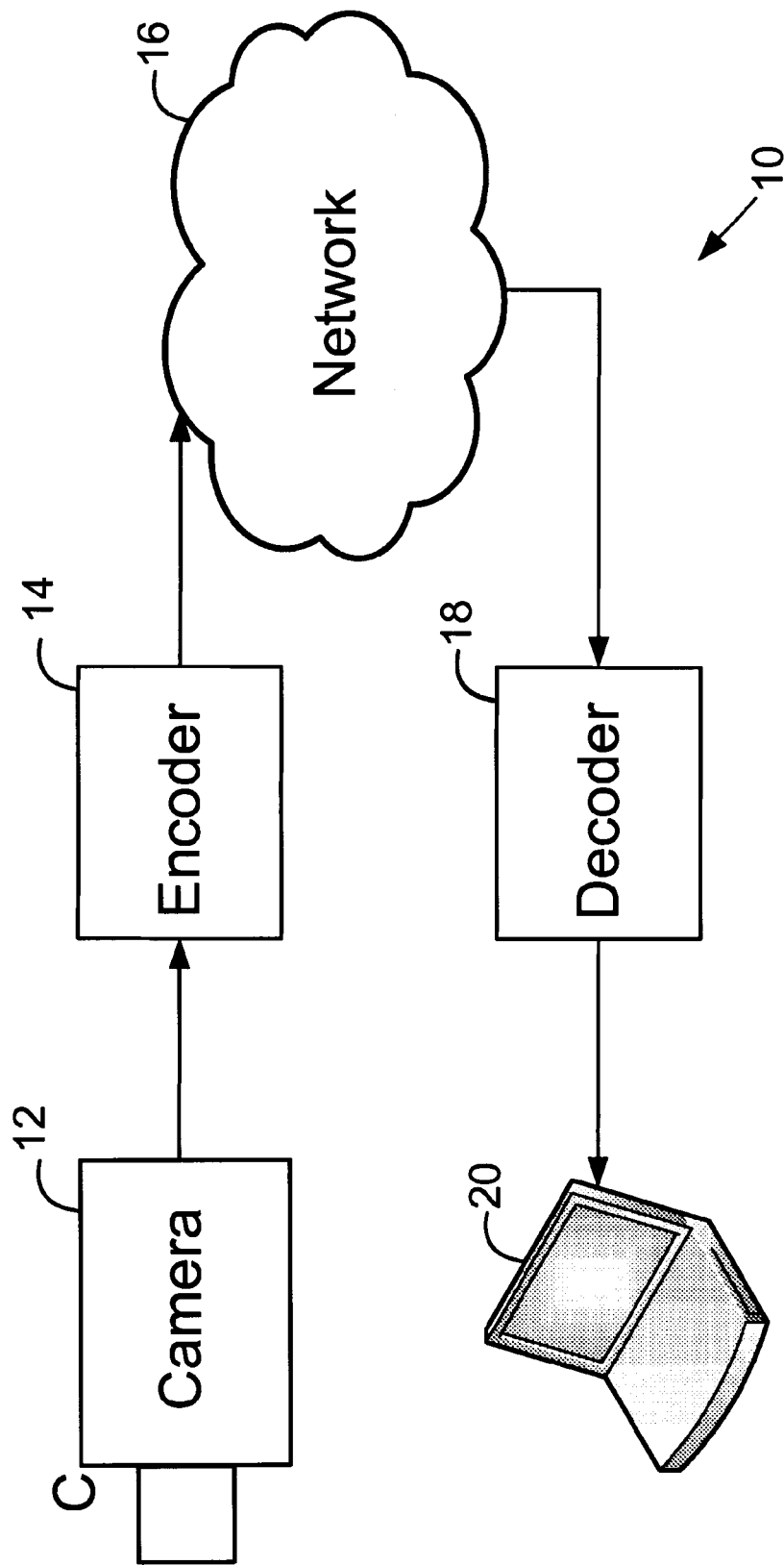
FIG. 1 is a schematic diagram of an example of video communication system.

Generally stated, a device and method for rate (bitrate) control in video coding according to a non-restrictive illustrative embodiment of the present invention ensures that an average bitrate is met without exceeding an allowed maximum bitrate (or a maximum size limit of a video buffer verifier). More specifically, the rate (bitrate) control is buffer-based and considers a distance between an Inter frame and the next Intra frame, a measured frame complexity, a current buffer level of a video buffering verifier and a calculated target buffer level of the video buffering verifier. In this manner, the visual quality is enhanced in various video applications such as tele-surveillance, fast-action movies, etc.

It should be noted that the portability of the rate control according to the non-restrictive illustrative embodiment of the present invention is improved and facilitates integration thereof into a plurality of video coders using coding schemes such as, as non-limitative examples, H.263, MPEG-4 and H.264.

The device and method for rate control in video coding according to the non-restrictive illustrative embodiment of the present invention generally improves the video quality and video coding performance by considering the following aspects:

1) As proposed by Xie and Zeng, frame complexity is exploited when computing a target frame size. For example, the bigger is the difference between an image to encode and the previous image (or the details the latter contains), the more complex to encode is that image in terms of bits to allocate. In that case, a larger amount of bits should be allocated to the encoding of that image in order to obtain a constant quality. In order to evaluate frame complexity, frame complexity metrics can be used such as the mean absolute difference (MAD) or other similar metrics.

2) Scene cuts can be detected in a video sequence for example through frame complexity metrics computation. By knowing the different scene cuts present in a video sequence, the buffer-based rate control device and method can select more appropriately Intra frames so as to obtain a better quality of the video sequence. In this case, the motion estimation is moved prior to the frame mode determination.

3) Each Intra frame is encoded with the same quality as the previous frames. For that purpose, the target frame size for the Intra frames is not considered to be fixed but can be variable. Also, two (2) Intra frame encoding modes can be considered: the first mode uses quantization parameters (QPs) which are fixed for the whole duration of the frame, thus generally leading to a more uniform quality but less accurate frame size. The second encoding mode uses QPs which are updated for each macroblock (MB) line of the frame.

4) The buffer-based rate control device and method according to the non-restrictive illustrative embodiment of the present invention ensures that the video buffering verifier does not underflow or overflow by scaling the target frame size properly instead of using extra or unused bits to maintain the average bitrate.

5) A target frame size is computed which is dependent upon different parameters such as the distance between the Inter frame and the next Intra frame, a measured frame complexity, a current buffer level of the video buffering verifier and the calculated target buffer level of the video buffering verifier. Therefore, the computed target frame size is a dynamic value. The computed target frame size can be further scaled by a factor for a better control on the target frame size.

I. Video Communication System

First, an example of video communication system in which video coding takes place will be described.

Turning now to FIG. 1, the video communication system 10 comprises a video source 12, such as a video camera or web camera for capturing videos. Those videos are then supplied to a video encoder 14. The video encoder 14 is connected to a network 16. The network 16 establishes a communication link or channel for transmitting the encoded videos from the encoder 14 to a decoder 18. Finally, the decoder 18 is connected to a video player 20. The video player 20 can be a computer, a television set, or any device for displaying videos.

During a communication session between, for example, first and second parties, the videos captured by the video source 12 of the first party are received by the encoder 14 for being compressed and coded. Once the encoder 14 has finished encoding the video data, the encoded video is transmitted to the second party through a communication link or channel established by the network 16. At the second party's end, the decoder 18 receives the encoded video and starts decoding it. Once the encoded video is decoded, the decoder 18 sends the decoded video data to the video player 20, which then can start playing the video received in encoded form from the first party.

The encoder 14 will now be described in more detail with reference to FIG. 2.

The encoder 14 performs one or a plurality of processes $32_1$ to $32_7$ related to video coding; these processes are either conventional or not, or briefly described in the present disclosure or original and fully described hereinafter.

To perform at least a part of the above processes $32_1$ to $32_7$, the encoder 14 includes a motion estimation module 32, a motion compensation module 34, a transform module 36, generally a DCT as is the case for H.263 and MPEG-4 encoding, a quantizing module 38, a rate control device 42, a coefficient filtering module 37, and a video buffering verifier 40. The rate control device 42 controls several aspects of the coding process in order to meet an average as well as a maximum bitrate specification. The encoder 14 can be implemented using different platforms, for example the SPOT Xde® Server from Vantrix Corporation. Other suitable platforms can of course be contemplated. The video source 12 can be any source including, as non-limitative examples, a video file or a video camera using various standards such as MPEG-4, H.263 and H.264, etc.

The motion estimation module 32, including elements $32_1$ to $32_7$, of the encoder 14 predicts an area or areas of the previous frame that have moved into the current frame so that this or these areas do not need to be re-encoded.

Then, the motion compensation module 34 compensates for the movement of the above predicted area(s), detected by the motion estimation module 32, from a reference frame, generally the previous frame, into the current frame. This will enable the encoder 14 to compress and save bandwidth by encoding and transmitting only differences between the previous and current frames, thereby producing an Inter frame.

The transform module 36 performs a transformation on blocks of pixels of the successive frames. The transformation depends on the video coding standard technology. In the case of H.263 and MPEG-4, it is a DCT transformation of blocks of pixels of the successive frames. In the case of H.264, the transformation is a DCT-based transformation or a Hadamar transform. The transformation can be made upon the whole frame (Intra frames) or on differences between frames (Inter frames). DCTs are generally used for transforming blocks of pixels into "spatial frequency coefficients" (DCT coefficients). They operate on a two-dimensional block of pixels, such as a macroblock (MB). Since DCTs are efficient at compacting pictures, generally a few DCT coefficients are sufficient for recreating the original picture.

The transformed coefficients are then supplied to the filter coefficient module 37, in which the transformed coefficients are filtered. For example, the filter coefficient module 37 sets some coefficients, corresponding to high frequency information for instance, to zero. The filter coefficient module 37 improves the performance of the rate control device 42 in case of small target frame sizes.

The filtered transformed coefficients are then supplied to the quantizing module 38, in which they are quantized. For example, the quantizing module 38 sets the near zero filtered DCT coefficients to zero and quantizes the remaining non-zero filtered DCT coefficients.

A reorder module 39 then positions the quantized coefficients in a specific order in order to create long sequences of zeros.

An entropy coding module 33 then encodes the reordered quantized DCT coefficients using, for example, Huffman coding or any other suitable coding scheme. In this manner, the entropy coding module 33 produces and outputs coded Intra or Inter frames.

The video buffering verifier (VBV) 40 is then used to validate that the frames transmitted to the decoder 18 will not lead to an overflow of the receiving buffer of this decoder. If a frame will not lead to an overflow, the rate control device 42 will allow the transmission of the frame through the switch 35. However, if a frame will lead to an overflow, the rate control device 42 will not allow the transmission of the frame.

The above motion estimation module 32, motion compensation module 34, transform module 36, quantizing module 38, reorder module 39, entropy coding module 33 and video buffering verifier 40 are otherwise known to those of ordinary skill in the art and, accordingly, will not be further described in the present disclosure.

Also, the rate control device 42 allows for controlling the bitrate in video coding. This rate control device 42 ensures that an average bitrate is met as much as possible without exceeding an allowed maximum bitrate. It provides enhanced visual quality in different applications such as telesurveillance, fast-action movies, etc.

Before describing a non-restrictive illustrative embodiment of the rate control device 42 and corresponding method 100 according to the present invention, an already existing basic buffer-based rate controller as described in Reference 2 will be described for the purpose of better understanding the rate control device 42 and method 100, which is based on such a basic buffer-based rate controller.

II. Basic Buffer-Based Rate Controller

The basic buffer-based rate controlling device is particularly useful in video streaming applications. It calculates target frame sizes for encoding Intra and Inter frames by distributing the unused bits over the following frames and maximizing the level of the video buffering verifier 40 over a certain number of frames.

In video streaming, video packets are sent through a capacity-limited channel. The bitrate is therefore limited. If a delay of one second is considered acceptable before the player 20 of FIG. 1 starts playing a first received Intra frame, the Intra frame target size should however be inferior to $R_{MAX}$, which is the maximum bitrate as will be explained herein below.

In the above situation, the decoder 18 waits for one (1) second before the player 20 starts playing the first received Intra frame. However, this does not mean that additional frames cannot be transmitted during this delay of one (1) second. Let's suppose that $B_I = R_{MAX}$, where $B_I$ is the target frame size of the Intra frame. Let's also suppose that not exceeding the maximum bitrate $R_{MAX}$ is equivalent to the condition that the video buffering verifier 40 does not exceed $R_{MAX}$.

Figure 2:
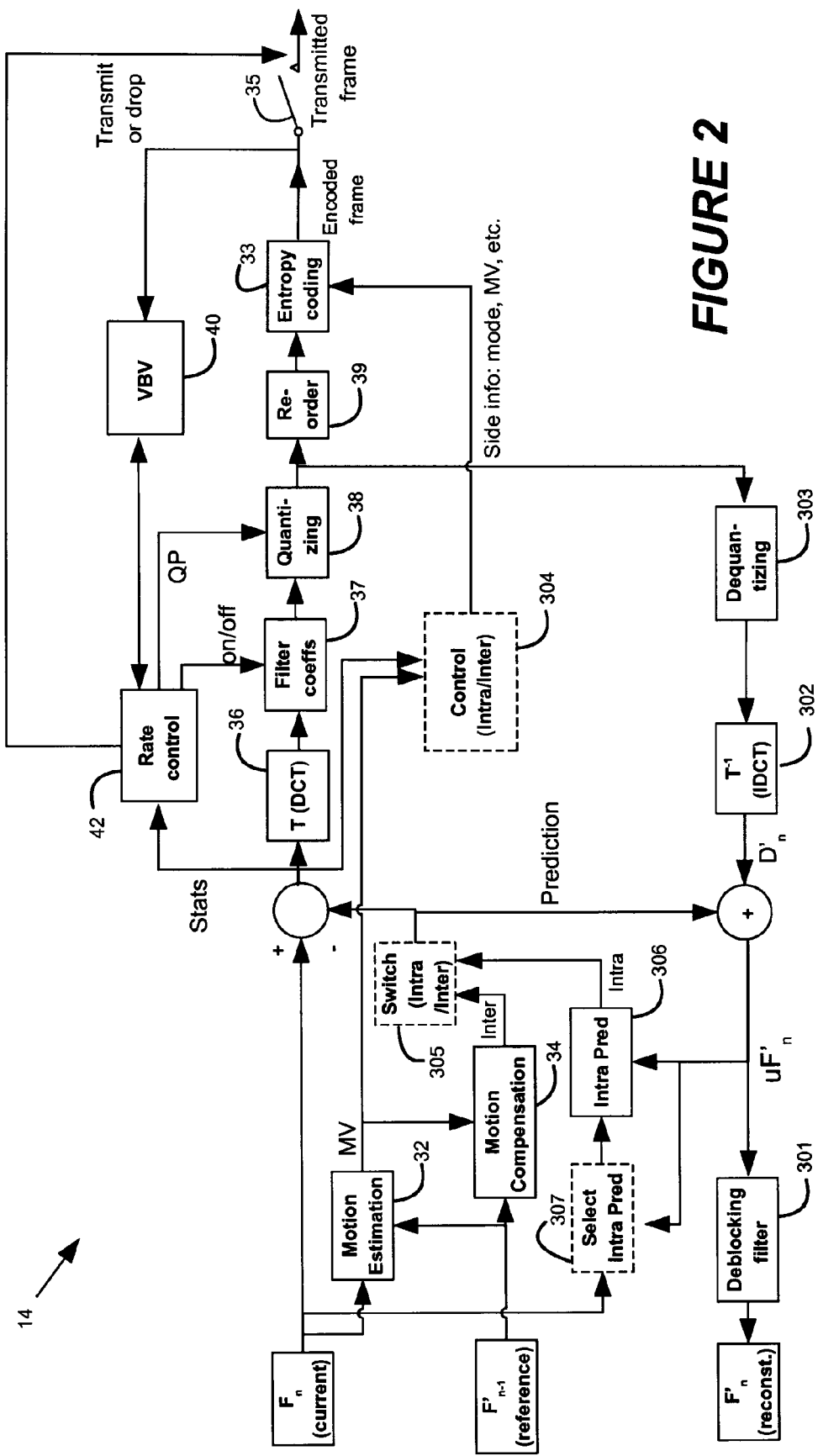
FIG. 2 is a schematic block diagram of an example of encoder for video coding in the communication system of FIG. 1.

Then, at time t=0, the video buffering verifier 40 of FIG. 2 is full, since a frame of size $R_{MAX}$ has just been stored.

If the frame rate F=10 fps and $R_{MAX}$=48000 bps, then at t=0.1 s, the video buffering verifier 40 is emptied by $R_{MAX}/F$=4800 bits, since those bits have been transmitted through the communication link or channel. Therefore, a space of 4800 bits becomes available in the video buffering verifier 40 for receiving an encoded frame at the given time of t=0.1 s and without overflowing the video buffering verifier 40.

The same approach applies for the following frames. Therefore, for each frame following the Intra frame, an additional amount of 4800 bits can be transmitted. Thus, with this approach, it is possible to transmit in total 48000+(10−1)(4800)=91200 bits, instead of 48000 bits for example using the TMN8 or maximum bitrate controlling devices.

The additional available bits allow for improving the quality of the frames following an Intra frame, since they can be used to increase the number of bits allocated for encoding the frames following the Intra frame.

However, it should be noted that the 91200 bits calculated previously are not sent during one (1) second but because of the delay induced by the applications to receive a transmitted Intra frame, the time covering those bits is 1.9 seconds: 1 second of delay and 9 frames from time 1.1 s to 1.9 s, which gives a bitrate of (91200 bits/1.9 s)=48000 bits/s, corresponding to the maximum bitrate $R_{MAX}$.

It will be considered throughout the present disclosure that the maximum size of the video buffering verifier 40 will correspond to the maximum bitrate $R_{MAX}$. (Now, the case where a next Intra frame is coming will be considered. Since the next Intra frame is coming, the video buffering verifier 40 has to be gradually emptied in order to have sufficient space for storing the upcoming Intra frame at its scheduled time.

Even though the target size for the Intra frame is $B_I$ and therefore a non empty buffer capable of accommodating a frame of size $B_I$ is sufficient, it is desirable, for practical purposes, to empty the video buffering verifier 40 so as to allocate more available bits to the frames following the Intra frame in order to improve their quality; therefore, in practical applications, $B_I < R_{MAX}$.

Accordingly, the number of bits allocated to the frames following the Intra frame can be increased so as to obtain an improved quality of those frames, before starting to empty the video buffering verifier 40.

Let t=0 be the time of arrival of an Intra frame. Then, N is defined as the number of frames following the Intra frame over which the bits unused for the encoding of the Intra frame are distributed. And L is defined as the number of Inter frames over which the buffer level of the video buffering verifier 40 is optimized. It should be noted that at t=L, the video buffering verifier 40 is full for 0≤N≤L.

Generally stated, the strategy adopted by this rate control is as follows.

At all times, the buffer level of the video buffering verifier does not exceed $R_{MAX}$, the maximum bitrate. This means that the encoded frames that will generate an overflow will be dropped. The bits unused in the encoding of the Intra frame are used in the encoding of the following Inter frames in order to maximize the buffer level and to increase the overall quality of the videos, since usually the quality of the videos is worse after an Intra frame. Until frame number L, the video buffering verifier 40 is kept full by encoding frames with a target size of $R_{MAX}/F$, F being the frame rate. Furthermore, the bits that have been computed but not used in the encoding of the previous frames are redistributed over the following frames; however the target frame size should not exceed a certain value, which depends on a target buffer level which itself depends on the frame index in time. It should be noted that the target buffer level is $R_{MAX}$ for the first frame after an Intra frame and gradually decreases to zero (0) until the next Intra frame comes.

There are many ways for distributing the unused bits resulting from the encoding of the Intra frame over the following Inter frames, with the condition that after frame L the video buffering verifier 40 will be substantially full. Therefore, the target frame size $B_p(t)$ for each type of frames and index, during a period T between two (2) Intra frames is given by:

$$B_P(t) = B_I$$
if $t = 0$ $$B_P(t) = B_P^I(t)$$
if $t = 1, 2, 3, \ldots, L$ $$B_P(t) = \frac{TR_{MAX} - FB_I - F\sum_{k=1}^{L} B_P^I(k)}{F(T - L - 1)}$$
if $t = L, L+1, \ldots, T-1$ with $B_I$ being the target frame size of an Intra frame, $B_P^I(t)$ being an arbitrary Inter frame target size but with the condition that the video buffering verifier 40 does not overflow, i.e. the buffer level ≤$R_{MAX}$ and is near full at t=L.

For example, the unused bits can be equally distributed over the target frame size $B_p(t)$ of the N Inter frames following the Intra frame. In this case, the target frame size for each Inter frame at time t is given by:

$$B_P(t) = \frac{R_{MAX}}{F} + \frac{(R_{MAX} - B_I)}{N}$$
if $0 < t \leq N$ $$B_P(t) = B_P^I = \frac{R_{MAX}}{F}$$
if $N < t \leq L$ $$B_P(t) = B_P^P = \frac{R_{MAX}(T - F - L)}{F(T - L - 1)}$$
if $t = L, L+1, \ldots, T-1$ It should be noted that when L=N, the term $$B_P^I = \frac{R_{MAX}}{F}$$

is absent. Also, it is required that T>F+L so that the video buffering verifier 40 will have sufficient time to empty itself between two Intra frames.

For each frame, the maximum buffer level should be computed so as to ensure that there is sufficient space in the video buffering verifier 40 for storing the next Intra frame. For an Intra frame, the maximum buffer level cannot exceed $R_{MAX}$. Therefore, for the frame at T−1, the maximum buffer level cannot exceed $R_{MAX}-B_I+R_{MAX}/F$ so that at the beginning of the next Intra frame, the maximum buffer level does not exceed $R_{MAX}-B_I$.

However, for practical reasons, the maximum buffer level should be $R_{MAX}/F$ instead of $R_{MAX}-B_I+R_{MAX}/F$, as mentioned hereinabove. This is because, in reality, it is difficult to predict precisely the actual size of the encoded Intra frame. The current existing algorithms are not sufficiently robust. Therefore, it is safer that the video buffering verifier 40 be empty at frame T−1 so that more bits are available and can be used for transmitting the frames following the Intra frame.

Therefore, the maximum buffer level of the video buffering identifier is calculated as follows:

$$BufferLevel_{MAX}(t) = R_{MAX}$$
if $t = 0, 1, \ldots, L$

-continued $$BufferLevel_{MAX}(t) = \frac{R_{MAX}(FT - F - L)}{F(T - L - 1)} + t\frac{R_{MAX}(1 - F)}{F(T - F)}$$

if $t = L+1, \ldots, T-1$

In addition to the maximum buffer level, the buffer level is updated and calculated for each Inter frame as the video buffering verifier 40 receives frames of different sizes. At the beginning of the transmission, the video buffering verifier 40 is empty. Then, progressively, frames of size $B_I$ and $B_p(t)$, as calculated, are inserted and stored into the video buffering verifier 40. Therefore, the buffer level of the video buffering verifier 40 is given by the following:

$$BufferLevel(t) = R_{MAX} - \frac{(N-t)(R_{MAX} - B_I)}{N}$$

if $0 \leq t \leq N$ $$BufferLevel(t) = R_{MAX}$$

if $N \leq t < L$ $$BufferLevel(t) = \frac{R_{MAX}(FT - F - L)}{F(T - L - 1)} + t\frac{R_{MAX}(1 - F)}{F(T - F)}$$

if $t = L+1, \ldots, T-1$

Therefore, the margin $\Delta(t)$ for encoding a frame can be given as follows:

$$\Delta(t) = BufferLevel_{MAX}(t) - BufferLevel(t),$$

so that $$\Delta t = \frac{(N-t)(R_{MAX} - B_I)}{N}$$

if $0 \leq t \leq N$ $$\Delta(t) = 0$$

if $N \leq t < T-1$

Generally, when the encoder 14 encodes a frame, the encoded frame size is slightly different than the target frame size. In case a target frame size is larger than the encoded frame size, the unused bits are redistributed over the next frames for encoding. Different methods can be used for distributing the unused bits over the next frames, as long as the maximum buffer level is not exceeded. The number of possible additional bits E(t), available for encoding the next frames is defined as:

$$E(t) = BufferLevel(t) - BufferLevel_{actual}(t) = BufferLevel_{MAX}(t) - BufferLevel_{actual}(t) - \Delta(t)$$

where $BufferLevel_{actual}(t)$ is the buffer level after actual encoding of a frame.

It should be noted that, generally, a fraction of the additional unused bits is used to ensure that the maximum buffer level is not exceeded. It is believed to be within the knowledge of those of ordinary skill in the art to specify and determine this fraction of the additional bits.

However, it may happen that an encoded frame is larger than a target frame size. In this case E(t) is negative or is inferior to a certain given threshold value. Therefore, a validation process is performed on the encoded frame. If the encoded frame has exceeded the target frame size, then this encoded frame is dropped.

The above described basic buffer-based rate control shows good performance in applications such as video surveillance and personal video clips. However, it exhibits some problems with sequences having a large amount of motion and scene changes, which are often present in video trailers for example. Therefore, for the latter applications, an improved buffer-based rate control device and method are needed, such as the device 42 of FIG. 2 and the corresponding method. The device 42 is built upon the above described basic buffer-based rate controlling device. Accordingly, only the new aspects of the device 42 will be discussed in the following description.

III. Buffer-Based Rate Control Device 42

The device 42 according to a non-restrictive embodiment of the present invention implements an improved buffer-based rate controlling method exploiting frame complexity, distance between the Inter frame and the next Intra frame, current buffer level of the video buffering verifier and calculated target buffer level of the video buffering verifier to meet with a specified average bitrate without exceeding a specified maximum bitrate. More specifically, the device 42 implements a method 100 for controlling the bitrate in video coding standards such as H.263, H.264, MPEG-4 and others. The device 42 and method 100 will be described herein below.

Figure 3:
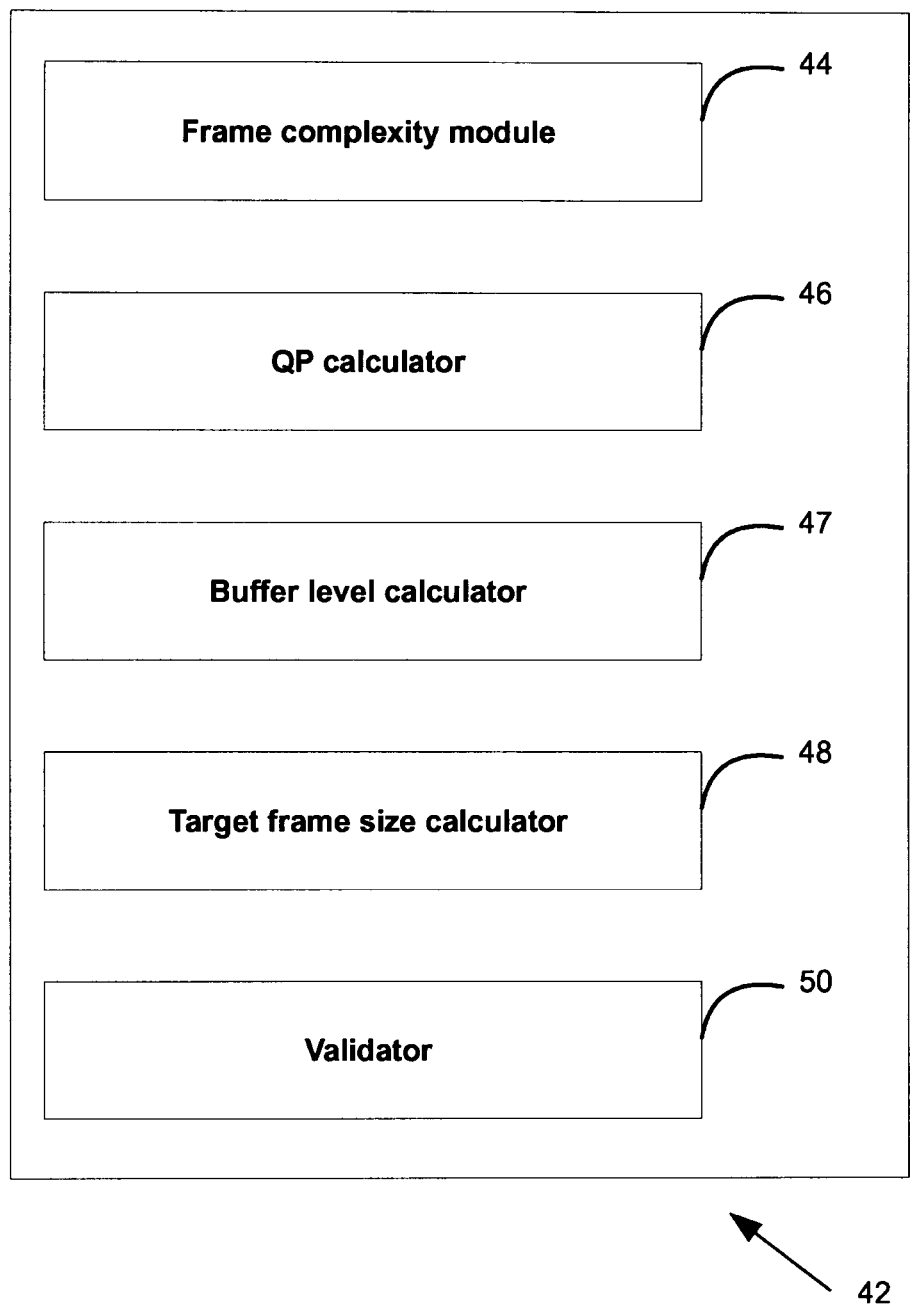
FIG. 3 is a schematic block diagram of a device for rate controlling in video coding in accordance with a non-restrictive illustrative embodiment of the present invention.

The device 42, as illustrated in FIG. 3, includes a frame complexity detector 44 for measuring the complexity of a frame and a QP (Quantizing Parameter) calculator 46 for calculating the QP of an Intra frame to be encoded. Furthermore, the device 42 includes a buffer level calculator 47 for calculating a target buffer level of the video buffering verifier 40. The device 42 still further includes a target frame size calculator 48 for calculating a target frame size for encoding a frame. The target frame size is calculated in relation to the frame complexity measurement from the frame complexity detector 44 and the target buffer level of the video buffering verifier level 40 from calculator 46. The device 42 also includes a validator 50 for determining and ensuring that the computed target frame size from calculator 48 is valid.

The basic buffer-based rate controller as described hereinabove uses additional bits to ensure that the video buffering verifier never exceeds the maximum bitrate. In the device 42, this condition is satisfied by a scaling factor applied on the computed target frame size so as to avoid underflow or overflow of the video buffering verifier 40 as will be described herein below.

IV. Buffer-Based Rate Control Method 100

Now, turning to FIG. 4, the method 100 according to a non-restrictive illustrative embodiment of the present invention, for buffer-based rate controlling using the device 42 will be described.

Before describing the method 100, some notations will be first introduced.

W(t) corresponds to the buffer level of the video buffering verifier 40 at time t and corresponds to $BufferLevel_{actual}(t)$ in the case of the basic buffer-based controller;

$W_{max}$ is the maximum buffer size of the video buffering verifier 40 and corresponds to $BufferLevel_{MAX}(t)$ in the case of the basic buffer-based rate controller;

$W_{high}$ is a buffer level of the video buffering verifier 40, which is considered high, i.e. with a risk of overflow of the video buffering verifier 40;

$W_{low}$ is a buffer level of the video buffering verifier 40, which is considered low, i.e. with a risk of underflow of the video buffering verifier 40;

$W_{AtLastIntra}$ is the buffer level of the video buffering verifier 40 after encoding the last Intra frame;

$W_{target}(t)$ is the target buffer level of the video buffering verifier 40 at time t, which corresponds to BufferLevel(t) in the case of the basic buffer-based rate controller;

$R_{MAX}$ is the maximum bitrate as specified;

$R_{AVG}$ is an average bitrate as specified;

B(t) represents the target frame size; B(t)=B$_I$(t) if the frame is an Intra frame and B(t)=B$_P$(t) if the frame is an Inter frame; and T is the period between two Intra frames.

Operation 102:

In operation 102 of method 100, a maximum bitrate R$_{MAX}$ and an average bitrate R$_{AVG}$ are specified. It is believed to be within the knowledge of one of ordinary skill in the art to determine these two values.

Operation 104:

In operation 104, the maximum buffer size W$_{max}$ of the video buffering verifier 40 is set. For example, W$_{max}$ is set to be equal to the maximum bitrate R$_{MAX}$, i.e. W$_{max}$=R$_{MAX}$. Once W$_{max}$ is set, then W$_{high}$ can be determined, such as W$_{high}$=0.8W$_{max}$, for example. Moreover, W$_{low}$ can be determined such as W$_{low}$=0.05 W$_{max}$. Of course, other values for W$_{high}$ and W$_{low}$ respectively defining upper and lower limits of the buffer level of the video buffering verifier 40 can be determined to avoid respectively an overflow and an underflow of the video buffering verifier 40.

The buffer level calculator 47 (FIG. 3) calculates the target buffer level W$_{target}$(t) at time t. Several strategies can be adopted to conduct this calculation. For example, W$_{target}$(t) can start with an initial buffer level obtained after encoding an Intra frame, and then W$_{target}$(t) decreases linearly until it reaches a target buffer level of R$_{AVG}$/F at the frame preceding the next Intra frame, i.e. at the frame at time t=T−1. In such a case, the target buffer level W$_{target}$(t) is given by:

$$W_{target}(t) = W_{AtLastIntra}\left(1 - \left(\frac{t}{T-1}\right)\right) + \frac{R_{AVG}}{F} \quad (1)$$

for $0 < t < T$

Alternatively, the target buffer level W$_{target}$(t) can also be calculated according to the following equation:

$$W_{target}(t) = W_{max}\left(1 - \left(\frac{t}{T-1}\right)\right) + \frac{R_{AVG}}{F}, \quad (2)$$

where $0 < t < T$

Both equations (1) and (2) and eventually other relations can be used as long as they yield an empty video buffering verifier 40 before the beginning of the next Intra frame.

Operation 106:

In operation 106, the target frame size calculator 48 calculates a target frame size for each frame to be encoded. In order to calculate a target frame size for each frame, first the type of the frame is determined. If the frame is an Intra frame, then method 200 will be used to compute the target frame size assigned to the Intra frame. If the frame is an Inter frame, then method 250 will be used to compute the target frame size for the Inter frame.

Operation 108:

Once the target frame size is calculated, the validator 50 (FIG. 3) validates the calculated target frame size in operation 108 so as to avoid overflow and/or underflow of the video buffering verifier 40.

Operation 110:

It can be observed that a large amount of frames can be dropped. To reduce the number of dropped frames, the filter coefficient module 37 (FIG. 2) applies a filtering on the transformed coefficients (usually DCT coefficients) in operation 110.

Operation 112:

The validation process 112 validates an actual encoded frame. If the actual encoded frame size leads to an overflow of the video buffer verifier 40, i.e. if the encoded frame size exceeds the maximum value permissible to avoid overflow of the video buffering verifier 40, then the encoded frame is dropped. The state variables of the encoder 14 are then restored to the values set prior to the encoding of the dropped frame. An overflow occurs when the frame cannot be added to the VBV 40 without exceeding the maximum size of the VBV 40, i.e. when the sum of the buffer level and the frame size is larger than the maximum size limit of the VBV 40.

Figure 4:
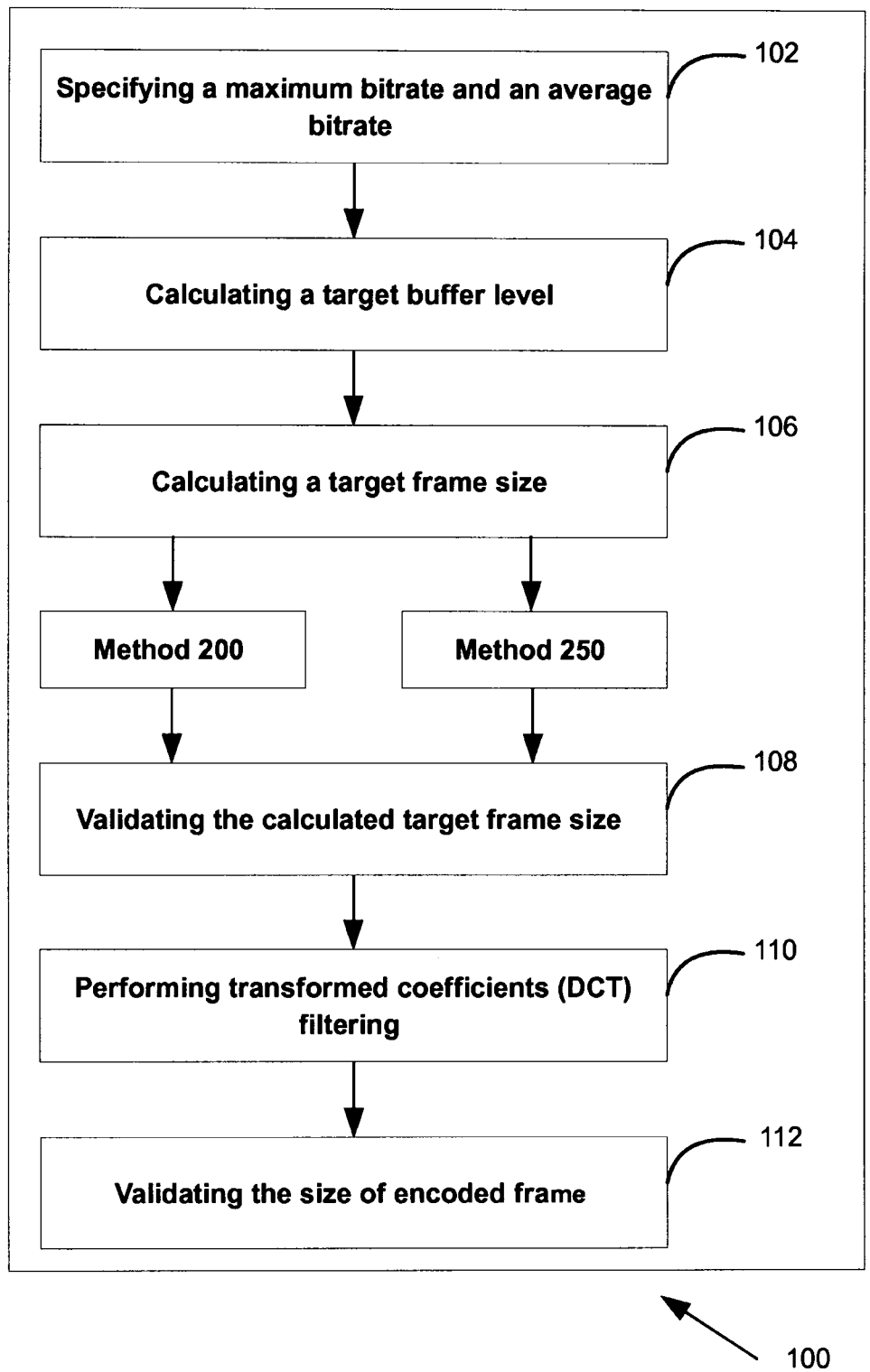
FIG. 4 is a flow chart illustrating a method for rate control in video coding in accordance with a non-restrictive illustrative embodiment of the present invention.

Operations 106, 108 and 110 of the buffer-based rate control method 100 of FIG. 4 will be now described with greater detail.

Figure 5:
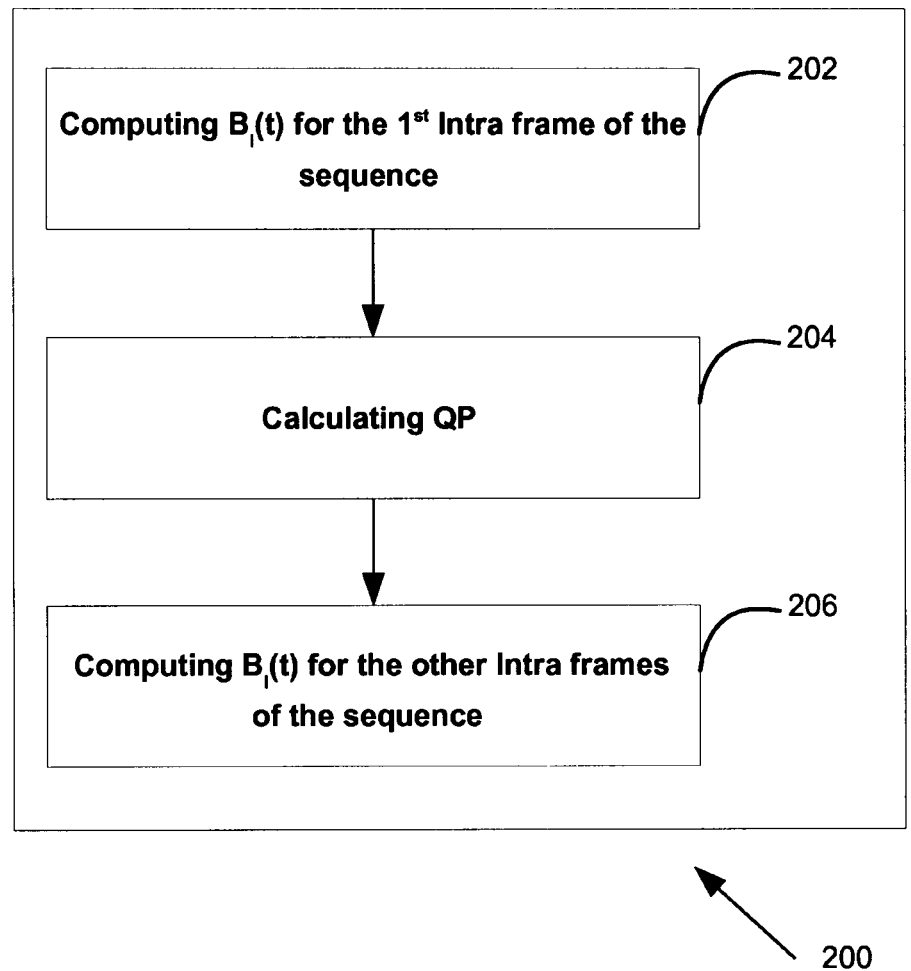
FIG. 5 is a flow chart illustrating a method of calculating an Intra frame target size in the rate control method of FIG. 4.

Operation 106 (Method 200):

If the frame to encode is an Intra frame, then method 200 of FIG. 5 is used for calculating the target frame size of the Intra frame.

Referring to FIG. 5, the method 200 will be described now.

Operation 202 (FIG. 5):

If the Intra frame corresponds to the first Intra frame of the sequence of video frames, then the target frame size calculator 48 calculates in operation 202 the Intra frame target size B$_I$(t) using the following relation:

$$B_I(t) = \xi W_{max} \quad (3)$$

with $\xi$=0.6, for example, and W$_{max}$ being as specified in operation 102 of method 100.

It should be noted that the scaling term $\xi$ can potentially assume other values.

For the other Intra frames of the video sequence, the target frame size calculator calculates the Intra frame target size B$_I$(t) by determining the smallest value of B$_I$ which satisfies QP≤QP$_{avg}$(t), where QP$_{avg}$(t) is the average of the QPs over a period of time.

Operation 204:

Computation and prediction of QP (Quantization parameter) are already known to those of ordinary skill in the art. Two modes of calculating the QP can be implemented. The first mode consists of computing a QP which is fixed for a whole frame. The second mode consists of calculating and updating the QP for each macroblock of a frame so as to follow more closely and precisely a given target frame size.

It should be noted that using a fixed QP leads to achieve a more uniform quality between frames but a less accurate frame size.

In operation 204, the QP calculator 46 (FIG. 3) calculates the values of the QP of the Intra frame using the following relation:

$$QP = \frac{16.34}{B_I^{2.05}} MAV_{DCT}^{1.0+0.29 \ln(B_I)} \quad (4)$$

with $$MAV_{DCT} = \frac{1}{MN}\sum_{u=0}^{N-1}\sum_{v=0}^{M-1} \text{ABS}(F(u,v)), F(u,v)$$

containing the 8×8 DCT coefficients of all blocks of pixels of the image of size N×M and B$_I$ is a given Intra frame target size (in bits).

The term MAV$_{DCT}$ represents a mean absolute value of the DCT coefficients, and indicates an image complexity measure. The term ABS( ) is the absolute value function.

Operation 206:

In operation 206, the target frame size calculator 48 (FIG. 3) calculates the Intra frame target size using the following relation:

$$B_I(t) = \text{smallest } B_I \text{ such that } QP <= QP_{avg}(t) \quad (5)$$

It should be noted that an iterative method can be used to calculate the Intra frame target size $B_I$ satisfying the condition that $QP \leq QP_{avg}(t)$. More specifically, a bisection method can be used iteratively.

Operation 106 (Method 250):

When the frame is an Inter frame, then method 250 of the method 100 of FIG. 4 is used to compute the target frame size of the Inter frame.

Figure 6:
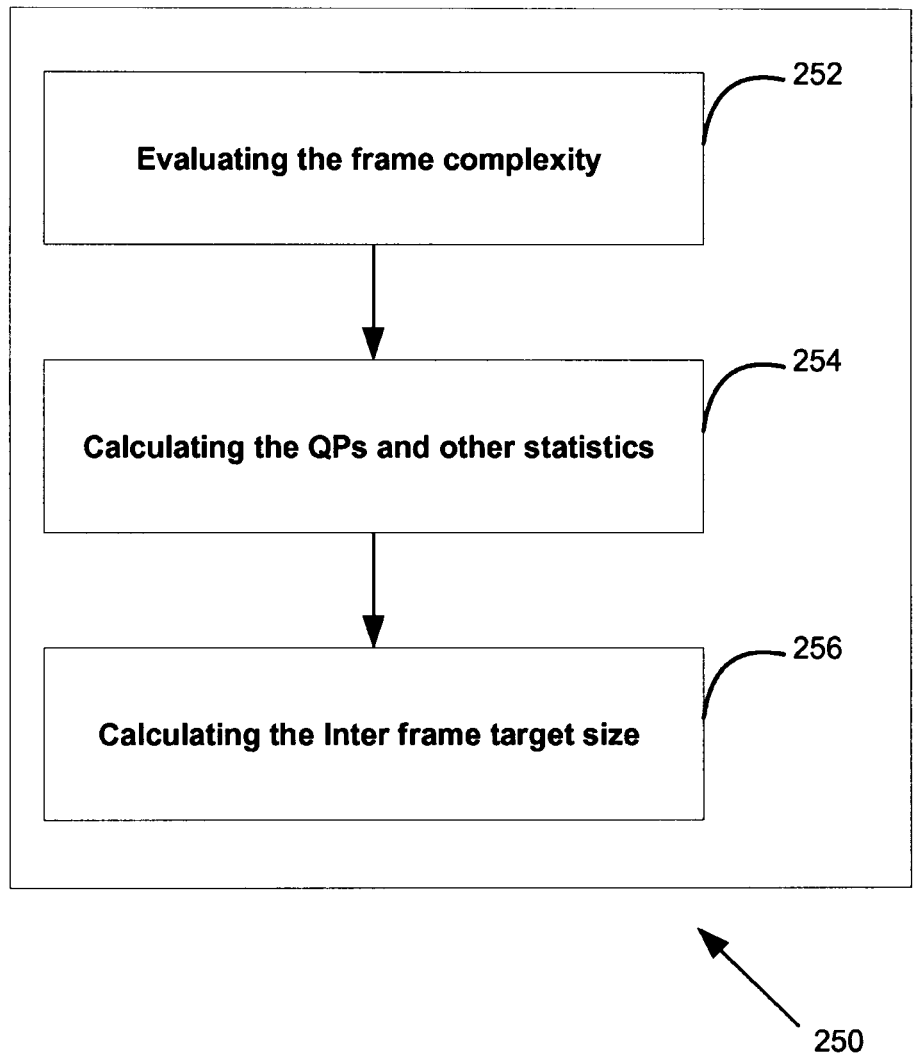
FIG. 6 is a flow chart illustrating a method of calculating an Inter frame target size in the rate control method of FIG. 4.

Turning now to FIG. 6, method 250 for computing an Inter frame target size will be described.

Operation 252:

In operation 252, the frame complexity detector 44 evaluates the complexity of the frame using different metrics.

Upon evaluating frame complexity, different metrics can be measured and calculated such as the Mean Absolute Differences (MAD), Mean Absolute Differences for the Intra frames ($MAD_I$) and Mean Absolute Differences for Activities ($MAD_A$).

More specifically, the MAD, for an image of size or resolution M×N at time t, is defined as follows:

$$MAD(t) = \quad (6)$$

$$\frac{1}{MN + 2M'N'} \left( \sum_{x=0}^{N-1} \sum_{y=0}^{M-1} ABS \left[ Y(t,x,y) - \hat{Y}(t-1, x-m_x, y-m_y) \right] + \right.$$

$$\sum_{x=0}^{N'-1} \sum_{y=0}^{M'-1} ABS \left[ U(t,x,y) - \hat{U}\left(t-1, x-\frac{m_x}{2}, y-\frac{m_y}{2}\right) \right] +$$

$$\sum_{x=0}^{N'-1} \sum_{y=0}^{M'-1} ABS \left[ V(t,x,y) - \right.$$

$$\left. \left. \hat{V}\left(t-1, x-\frac{m_x}{2}, y-\frac{m_y}{2}\right) \right] \right)$$

where Y( ) is the luminance component of the original image, U( ) and V( ) are the chrominance components of the original image, $\hat{Y}$( ) is the luminance of the reconstructed, previous image of resolution M×N at the decoder 18 (FIG. 1), $\hat{U}$( ) and $\hat{V}$( ) are the chrominance components of the reconstructed, previous image of resolution M'×N' at the decoder 18 (FIG. 1), and ($m_x$, $m_y$) is an optimal motion vector for luminance along coordinates x and y of the image.

It should be observed that the larger is the mismatch between the current frame to encode and the reconstructed, previous frame, the more bits are required to encode the current frame so as to reach a certain level of quality. Therefore, for frames having higher values of MAD, more bits should be assigned to those frames for encoding.

In the case where the $MAD_A$ metric is used, the $MAD_A$ for an image of resolution M×N at time t, is defined as follows:

$$MAD_A(t) = \quad (7)$$

$$\frac{1}{MN + 2M'N'} \left( \sum_{x=0}^{N-1} \sum_{y=0}^{M-1} ABS[Y(t,x,y) - (t-1, x-m_x, +Yy-m_y)] \right.$$

$$\sum_{x=0}^{N'-1} \sum_{y=0}^{M'-1} ABS\left[ U(t,x,y) - t-1, x-\frac{m_x}{2}, +Uy-\frac{m_y}{2} \right] +$$

$$\left. \sum_{x=0}^{N'-1} \sum_{y=0}^{M'-1} ABS\left[ V(t,x,y) - V\left(t-1, x-\frac{m_x}{2}, y-\frac{m_y}{2}\right) \right] \right)$$

for an image of resolution M×N at time t

Y is the luminance, U and V the chrominance components of the original image ($m_x$, $m_y$) the optimal motion vector for luminance Furthermore, the frame complexity detector 44 can calculate a complexity measure for an Intra frame. In this case, the $MAD_I$ is used and the reconstructed image used in equations (6) and (7) is set to zero since it is not used during encoding of the Intra frame. Therefore, the frame complexity detector 44 can calculate the $MAD_I$ as follows:

$$MAD_I(t) = \frac{1}{MN + 2M'N'} \left( \begin{array}{l} \sum_{x=0}^{N-1} \sum_{y=0}^{M-1} ABS[Y(t,x,y)] + \\ \sum_{x=0}^{N'-1} \sum_{y=0}^{M'-1} ABS[U(t,x,y)] + \\ \sum_{x=0}^{N'-1} \sum_{y=0}^{M'-1} ABS[V(t,x,y)] \end{array} \right) \quad (8)$$

Operation 254:

In operation 254, other statistics can be calculated. These other statistics may include $QP_{avg}(t)$, an average QP calculated by the QP calculator 46 (FIG. 3) over a period of time and $MAD_{avg}(t)$, an average MAD calculated by the frame complexity module 44 (FIG. 3) over a period of time.

Operation 256:

In operation 256, the target frame size calculator 48 (FIG. 3) calculates the Inter frame target size $B_P(t)$ using the following equation:

$$B_P(t) = \frac{R_{AVG}}{F} \beta(t) \min\left( \gamma \alpha(t), \sqrt{\frac{MAD(t)}{1 + MAD_{avg(t-1)}}} \right) \quad (9)$$

with $$\alpha(t) = 1 - \left( \frac{W(t)}{W_{high}} \right)^2 \text{ if } W(t) < W_{high} \quad (10)$$

and $$\alpha(t) = 0, \text{ if } W(t) \geq W_{high}$$

and $$\beta(t) = 1 - \left[ \frac{W(t) - W_{target}(t)}{W_{max} - W_{target}(t)} \left( \frac{t}{T-1} \right) \right] \quad (11)$$

if $W(t) > W_{target}(t)$ and $\beta(t) = 1$ otherwise where γ is a constant value, for example 4, although other values can be used, and $W_{target}(t)$ is calculated in operation 104 of method 100 (FIG. 4).

Equation (9) shows the dynamics of the Inter frame target size in relation with the other variables. For example, it should be noted that the Inter frame target size $B_P(t)$ is roughly proportional to $$\sqrt{\frac{MAD(t)}{MAD_{avg}(t)}}.$$

Since the values of MAD(t) are usually large, adding one (1) in the denominator of equation (9) has no significant numerical impact in the equation. Furthermore, adding one (1) allows for avoiding divisions by zero to occur. In some special cases, where the bitrate is very high, a fractional value smaller than one (1) is more appropriate to avoid accuracy problems.

Furthermore, the term $$\sqrt{\frac{MAD(t)}{1+MAD_{avg}(t-1)}}$$

in equation (9) is saturated by $4\alpha(t)$, when $\gamma=4$, so as to limit the gain (in size) given by the ratio of $MAD(t)/MAD_{avg}(t-1)$. In this manner, the gain limit is lowered as the buffer level of the video buffering verifier 40 increases. For example, if the video buffering verifier 40 is empty, then the Inter frame target size $B_P(t)$ at that time is limited to 4 times the average bitrate, i.e.

$$B(t) = B_P(t) \leq 4 \frac{R_{AVG}}{F},$$

F being the frame rate. However, if $W(t) \geq W_{high}$, then the Inter frame target size $B_P(t)$ will be set to zero (0), since $\alpha(t)=0$ in this case; an overflow of the video buffering verifier 40 can then be avoided.

It should be noted that having a large $W_{high}$ often allows to improve the average PSNR (Peak Signal-to-Noise Ratio), but leads to higher risks of dropping encoded frames.

Further still, the factor $\beta(t)$ in equation (9) allows for reducing the Inter frame target size $B_P(t)$ in the case where $W(t) > W_{target}(t)$. The larger is the buffer level $W(t)$ compared to the buffer target level $W_{target}(t)$, the larger is the reduction induced by the factor $\beta(t)$ on the Inter frame target size $B_P(t)$. Also, the reduction factor $\beta(t)$ may be made more aggressive as the current frame gets closer to the upcoming Intra frame, i.e. when t gets closer to T. In this manner, larger deviations between $W(t)$ and $W_{target}(t)$ are more efficiently avoided as upcoming of the next Intra frame becomes imminent.

Also, since the reduction factor $\beta(t)$ can force the video buffering verifier 40 to be empty prior to encoding of the next Intra frame, several strategies adopted for the calculation of the initial buffer target level $W_{target}(t)$ can be used, using for example equations (1) and (2).

The target frame size calculator 48 (FIG. 3) may also calculate the Inter frame target size $B_P(t)$ using the Mean Absolute Differences for the Intra frames ($MAD_I$) and Mean Absolute Differences for Activities ($MAD_A$).

Operation 108:

Referring back to FIG. 4, once the target frame size B(t) has been computed in operation 106, the validator 50 (FIG. 3) applies a validation process on that calculated target frame size within a certain margin consideration.

First, in the validation process, the validator 50 checks for overflow. In order to avoid overflow, the following condition should be satisfied:

$$B(t) + W(t) - \frac{R_{MAX}}{F} \leq W_{high} \quad (12)$$

From expression (12), an upper or maximum threshold $B_{max}(t)$, which should not be exceeded by the computed target frame size, can be calculated as follows:

$$B_{max}(t) = W_{high} - W(t) + \frac{R_{AVG}}{F} \quad (13)$$

Then, the validator 50 (FIG. 3) checks for underflow. In order to avoid underflow, the following condition should be satisfied:

$$B(t) + W(t) - \frac{R_{MAX}}{F} \geq W_{low} \quad (14)$$

Then, from expression (14), a lower or minimum threshold $B_{min}(t)$ can be established for the calculated target frame size. The lower threshold $B_{min}(t)$ is given by:

$$B_{min}(t) = W_{low} - W(t) + \frac{R_{AVG}}{F} \quad (15)$$

It should be noted that the size of the encoded frames does not necessarily correspond to the size of the computed target frame size. Therefore an additional operation of validation is performed after the actual encoding of a current frame. Indeed, if the encoded frame size is larger than the maximum value permissible to avoid overflow of the video buffering verifier 40, then the encoded frame is dropped and the state variables of the encoder 14, corresponding to the values prior to encoding the dropped frame, are restored. Restoration of the state variables re-synchronizes the encoder 14 with the decoder 18. The state variables of the encoder 14 are memorized prior to encoding a frame.

Operation 110:

It has been observed that when a video sequence contains a large amount of motion, many frames are dropped or skipped in the encoder 14. This is due to the fact that when small target frame sizes are computed, they are generally not easily met.

Therefore, the filter coefficient module 37 of FIG. 2 is used to remove and filter some high frequencies of the transformed coefficients (usually DCTs), for small target frame sizes. More specifically, the filter coefficient module 37 is applied when the amount of dropped frames reaches a certain threshold within a certain period of time, for example the last second. Once the transformed coefficient filtering is activated, it remains usually in effect for a specific time, for example, 4 seconds, i.e. 40 frames if F=10 fps. The DCT coefficient filtering will be reactivated when the amount of dropped frames reaches again the given threshold. Therefore, the transformed coefficient filtering is an adaptive method.

It should be noted that it is within the scope and knowledge of one of ordinary skill in the art to select a given threshold for the amount of dropped frames per period of time.

More specifically, in operation 110, the filter coefficient module 37 (FIG. 2) first identifies a maximum coefficient filtering index denoted as max_DCT_coeff in the case of DCT coefficients. This maximum DCT filtering index max_DCT_coeff is selected from indices stored in a table, for example. This maximum DCT filtering index max_DCT_coeff can be based on the target frame size B(t). For example, the smaller is the target frame size B(t), the smaller is the maximum DCT filtering index max_DCT_coeff. The following table shows the maximum DCT filtering index max_DCT_coeff as a function of the target frame size B(t).

| Target frame size B(t) | Max_DCT_coeff |
|---|---|
| Below 50F | 0 |
| Between 50F and 100F | 1 |
| Between 100F and 200F | 2 |
| Between 200F and 300F | 3 |
| Between 300F and 400F | 4 |
| Between 400F and 500F | 5 |
| Otherwise | 6 |

Then, the filter coefficient module 37 (FIG. 2) performs DCT filtering on the encoded frames as follows:

$$DCT_{filtering}[i][j] = DCT[i][j] \text{ if } i \leq \text{max\_DCT\_coeff and } j \leq \text{max\_DCT\_coeff} \quad (16)$$

$$\text{And } DCT_{filtering}[i][j] = 0, \text{ otherwise} \quad (17)$$

By using equations (16) and (17), the DCT filtering is made adaptive. Indeed, most video sequences do not require DCT filtering, and if ever DCT filtering was applied on those video sequences, their quality would degrade. However, when DCT filtering is applied to video sequences which need DCT filtering, great performance improvement in the quality of such video sequences can be observed. For example, it has been observed that the amount of dropped frames decreased from 50% to 6%, when DCT filtering was applied when and where required.

V. Performance Results

In order to evaluate the performance of the buffer-base rate control device 42 and method 100, several video test sequences were used for testing the quality of the video coding and the percentage of frames kept (not dropped). The first twelve (12) video sequences are well-known video sequences and widely used in video coding publications. Those video test sequences have been applied to other rate control devices for comparison, as well. The other rate control devices include the TMN8 standard, and the "Maximum bitrate" based rate controller as disclosed in Reference 2. For simplicity, the condition $R_{AVG} = R_{MAX}$ was considered. Normally, having $R_{MAX} > R_{AVG}$ doesn't have a large impact of the average PSNR but reduces the probability of having dropped frames.

Furthermore, the following terms are used in the results of the tests and are defined as follows:

$PSNR_{avg}$: average Peak Signal-to-Noise Ratio of the sequence; if a frame is dropped, the PSNR of that frame is computed using the previously reconstructed frame, which is contained in the memory of the decoder 18;

$PSNR_{kept}$: average PSNR of frames which were kept in the sequence (i.e. not taking into account the dropped frames);

$PSNR_{min}$: PSNR of the frame with the lowest PSNR in the sequence;

StdDev: standard deviation of PSNR values of each frame with respect to the average; this is a measure of the quality consistency (smaller values of StdDev mean smaller fluctuations from the $PSNR_{avg}$);

Kbps: average bitrate in kilobits per second of the actual encoded sequence;

Total frms: total portion of frames kept (i.e. 1-percent_dropped); an "1" means that all frames were kept, and 0.6 would mean that 40% of the frames were dropped.

Test Case 1:

In the first test case, $R_{MAX}$=44 kbps, F=10 fps and T=8 s.

TABLE 1

Results from the TMN8 standard rate controller

| | TMN8 standard | | | | | |
|---|---|---|---|---|---|---|
| Sequence | PSNR | PSNRkept | PSNRmin | StdDev | kbps | Total frms |
| 0 Foreman | 30.72 | 31.39 | 26.46 | 3.5 | 44.22 | 0.9525 |
| 1 Carphone | 32.75 | 33.15 | 28.72 | 3.34 | 44.22 | 0.9607 |
| 2 Miss_am | 41.59 | 41.69 | 37.81 | 1.46 | 44.45 | 0.9933 |
| 3 Grandma | 38.62 | 38.73 | 33.63 | 1.99 | 44.14 | 0.977 |
| 4 Claire | 42.21 | 42.44 | 37.28 | 1.91 | 44.23 | 0.9696 |
| 5 Container | 36.38 | 36.87 | 33.75 | 3.04 | 44.31 | 0.9467 |
| 6 News | 35.07 | 35.94 | 30.53 | 4.06 | 44.34 | 0.94 |
| 7 Mthr_dotr | 36.26 | 36.5 | 32.33 | 2 | 44.12 | 0.9633 |
| 8 Salesman | 36.34 | 36.54 | 32.38 | 2.01 | 44.23 | 0.9532 |
| 9 silent | 35.02 | 35.57 | 32.05 | 3.03 | 44.35 | 0.9567 |
| 10 Suzie | 36.68 | 36.87 | 33.99 | 1.84 | 44.68 | 0.9867 |
| 11 Trevor | 34.61 | 35.16 | 28.78 | 4.46 | 44.69 | 0.9733 |
| 12 Hall | 37.01 | 37.52 | 33.72 | 3.17 | 44.31 | 0.9455 |
| 13 Test(menu) | 38.39 | 40.38 | 32.66 | 7.53 | 44.6 | 0.882 |
| 14 Incredibles | 40.04 | 41.04 | 27.7 | 12.78 | 42.62 | 0.9622 |
| 15 Building | 34.42 | 34.95 | 30.81 | 3.69 | 44.3 | 0.9207 |
| 16 CDR | 40.32 | 40.53 | 27.01 | 4.82 | 43.9 | 0.9733 |
| 17 Incred2 | 38.59 | 39.18 | 27.22 | 9.23 | 43.12 | 0.9756 |
| 18 Sample | 31.93 | 32.49 | 27.12 | 3.88 | 44.04 | 0.9611 |
| 19 IntoTheBleu | 31.39 | 33.19 | 24.67 | 9.04 | 43.82 | 0.9169 |
| 20 Balançoire | 17.19 | 23.24 | 19.88 | 6.73 | 44.28 | 0.4688 |
| 21 Tete claque | 40.86 | 41.36 | 26.67 | 14.68 | 41.95 | 0.955 |
| | 35.745 | 36.57864 | 30.235 | 4.917727 | 44.04182 | 0.933368 |

TABLE 2

Results from the "Maximum bitrate" based rate controller

Maximum bitrate

| Sequence | PSNR | PSNRkept | PSNRmin | StdDev | kbps | total frms |
|---|---|---|---|---|---|---|
| 0 Foreman | 30.21 | 30.69 | 26.31 | 3.03 | 38.36 | 0.9525 |
| 1 Carphone | 31.76 | 32.05 | 27.87 | 3.27 | 37.6 | 0.9607 |
| 2 Miss_am | 39.94 | 40.26 | 32.93 | 3.77 | 39.95 | 0.98 |
| 3 Grandma | 37.28 | 37.43 | 29.61 | 3.37 | 37.02 | 0.9667 |
| 4 Claire | 40.24 | 40.51 | 31.35 | 4.18 | 37.33 | 0.9737 |
| 5 Container | 35.34 | 35.52 | 29.57 | 3.02 | 38.6 | 0.98 |
| 6 News | 33.87 | 34.19 | 26.57 | 3.84 | 38.02 | 0.9633 |
| 7 Mthr_dotr | 35.15 | 35.34 | 28.96 | 2.9 | 37.16 | 0.9678 |
| 8 Salesman | 35.19 | 35.33 | 27.98 | 3.28 | 36.93 | 0.9666 |
| 9 Silent | 34.16 | 34.52 | 29.29 | 3.54 | 37.25 | 0.97 |
| 10 Suzie | 35.43 | 35.77 | 29.79 | 3.51 | 39.9 | 0.9733 |
| 11 Trevor | 33.27 | 34.33 | 27.63 | 5 | 39.36 | 0.92 |
| 12 Hall | 36.44 | 36.58 | 30.02 | 3.03 | 38.5 | 0.9848 |
| 13 test (menu) | 37.97 | 38.2 | 29.95 | 5.39 | 38.38 | 0.9831 |
| 14 incredibles | 38.45 | 39.75 | 27.23 | 12.6 | 37.42 | 0.9344 |
| 15 building | 34.06 | 34.15 | 28.31 | 3.1 | 37.41 | 0.9745 |
| 16 CDR | 38.34 | 38.99 | 26.84 | 6.21 | 36.7 | 0.9578 |
| 17 incred2 | 36.99 | 38.07 | 26.44 | 9.39 | 37.65 | 0.94 |
| 18 sample | 30.71 | 31.84 | 26.15 | 4.39 | 38.6 | 0.9066 |
| 19 IntoTheBleu | 30.49 | 32.57 | 22.55 | 8.34 | 39.14 | 0.8704 |
| 20 Balançoire | 17.85 | 22.79 | 19.86 | 5.68 | 38.92 | 0.4609 |
| 21 Tête claque | 39.63 | 39.9 | 26.29 | 15.03 | 34.99 | 0.97 |
|  | 34.67136 | 35.39909 | 27.79545 | 5.266818 | 37.96318 | 0.934414 |

TABLE 3

Results from the present buffer-based rate control device 42 with frame activity Buffer-based with frame activity

| Sequence | PSNR | PSNRkept | PSNRmin | StdDev | kbps | total frms |
|---|---|---|---|---|---|---|
| 0 Foreman | 31.25 | 31.25 | 27.58 | 1.43 | 44.01 | 1 |
| 1 Carphone | 33.01 | 33.01 | 28.74 | 2.49 | 44 | 1 |
| 2 Miss_am | 41.76 | 41.76 | 39.24 | 0.76 | 44.14 | 1 |
| 3 Grandma | 39.23 | 39.23 | 36.07 | 1.32 | 43.99 | 0.9989 |
| 4 Claire | 42.54 | 42.54 | 37.08 | 1.01 | 44.12 | 1 |
| 5 Container | 36.63 | 36.63 | 31.64 | 1.08 | 44.06 | 1 |
| 6 News | 35.83 | 35.88 | 32.38 | 1.45 | 43.92 | 0.99 |
| 7 Mthr_dotr | 36.5 | 36.5 | 33.55 | 1.4 | 44.01 | 1 |
| 8 Salesman | 36.74 | 36.74 | 32.92 | 1.1 | 43.72 | 0.9866 |
| 9 Silent | 35.45 | 35.45 | 32.36 | 1.14 | 44.06 | 1 |
| 10 Suzie | 36.78 | 36.78 | 34.7 | 0.92 | 44.13 | 1 |
| 11 Trevor | 35 | 35 | 28.68 | 2.7 | 44.14 | 1 |
| 12 Hall | 37.24 | 37.24 | 32.46 | 1.2 | 44.39 | 1 |
| 13 test (menu) | 38.6 | 38.6 | 26.66 | 4.89 | 44.6 | 1 |
| 14 incredibles | 40.53 | 40.53 | 28.29 | 11.71 | 42.83 | 1 |
| 15 building | 34.32 | 34.32 | 28.12 | 2 | 44.06 | 1 |
| 16 CDR | 40.8 | 40.8 | 28.67 | 3.96 | 44.01 | 1 |
| 17 incred2 | 38.81 | 38.81 | 27.76 | 8.38 | 43.1 | 1 |
| 18 sample | 32.41 | 32.41 | 27.16 | 2.62 | 44.79 | 1 |
| 19 IntoTheBleu | 32.45 | 32.48 | 24.47 | 6.29 | 44.01 | 0.9976 |
| 20 Balançoire | 20.66 | 20.93 | 17.83 | 4.31 | 45.21 | 0.957 |
| 21 Tête claque | 41.1 | 41.1 | 26.7 | 14.52 | 42.02 | 1 |
|  | 36.25636 | 36.27227 | 30.13909 | 3.485455 | 43.96909 | 0.996823 |

Analysis of the Results of Test Case 1

By comparing the results in the three (3) above tables, corresponding to the three types of rate controllers, it can be observed that the buffer-based rate control device 42 and method 100 according to the non-restrictive illustrative embodiment of the present invention yield an important improvement in video quality. Indeed, the average PSNR given by the buffer-based rate control device 42 and method 100 is 36.26 dB, which is higher than the average PSNR of the TMN8 and "Maximum bitrate" controllers, which are respectively 35.75 dB and 34.67 dB.

Regarding the quality of the worst frames in a video sequence, it can be seen that the worst frames from the buffer-based rate control device 42 and method 100 according to the non-restrictive illustrative embodiment of the present invention are still better than those from the "maximum bitrate" base rate controller (30.1 dB vs 27.8 dB). However, the performance of the buffer-based rate control device 42 and method 100 is below that of the TMN8 standard rate controller (which yields 30.3 dB), in terms of the worst frames. This is due to the fact that the TMN8 standard rate controller has no strict bitrate constraint to meet. It does not meet a maximum bitrate, for example.

In terms of the standard deviation (StdDev), the buffer-based rate control device 42 and method 100 according to the non-restrictive illustrative embodiment of the present invention yield the smallest deviation compared to the two other ones, thus showing a better consistency in video quality.

Finally, regarding the percentage of remaining frames, which are not dropped, the device 42 and method 100 show the best percentage, 99.7%, compared to 93.3% from the TMN8 standard rate controller and 93.4% from the "maximum bitrate" based rate controller. This results in a high performance of the device 42 and method 100 for keeping most frames in a video sequence. This characteristic is best illustrated with the sequence 20 ("Balançoire"), which yields the following percentage of remaining frames:

| | |
|---|---|
| TMN8: | 46.9% |
| "Maximum bitrate": | 46.1% |
| Buffer-based with frame activity: | 95.7% |

Test Case 2:

In the second test case, the sequences were encoded with a target bitrate of $R_{MAX}=44$ kbps, F=30 fps for inputs and outputs, and with a period between two Intra frames of T=8 s. The results are shown in the tables below.

TABLE 4

Results from the TMN8 standard rate controller

| | Sequence | PSNR | PSNRkept | PSNRmin | StdDev | kbps | total frms |
|---|---|---|---|---|---|---|---|
| 0 | Foreman | 25.43 | 27.84 | 25.27 | 5.7 | 44.76 | 0.8325 |
| 1 | Carphone | 28.59 | 29.69 | 26.22 | 4.29 | 44.82 | 0.9005 |
| 2 | Miss_am | 38.78 | 38.78 | 37.25 | 0.72 | 45.88 | 1 |
| 3 | Grandma | 35.18 | 35.41 | 33.33 | 1.95 | 44.22 | 0.9621 |
| 4 | Claire | 38.01 | 38.38 | 35.63 | 2.71 | 44.63 | 0.9534 |
| 5 | Container | 31.44 | 32.67 | 31.14 | 5.19 | 42.56 | 0.9133 |
| 6 | News | 29.8 | 31.42 | 28.6 | 5.15 | 42.43 | 0.9 |
| 7 | Mthr_dotr | 32.79 | 33.21 | 28.79 | 2.7 | 44.33 | 0.9589 |
| 8 | Salesman | 32.37 | 32.84 | 30.33 | 2.98 | 44.37 | 0.9532 |
| 9 | Silent | 30.58 | 31.63 | 29.43 | 4.39 | 45 | 0.9267 |
| 10 | Suzie | 33.09 | 33.35 | 30.54 | 2.75 | 46.03 | 0.9867 |
| 11 | Trevor | 28.83 | 30.9 | 26.96 | 7.09 | 45.44 | 0.9133 |
| 12 | Hall | 32.98 | 34 | 32.1 | 4.71 | 44.73 | 0.9273 |
| 13 | test (menu) | 30.96 | 34.33 | 30.74 | 9.81 | 44.27 | 0.8933 |
| 14 | incredibles | 28.45 | 36.54 | 26.81 | 13.28 | 43.67 | 0.6456 |
| 15 | building | 31.05 | 32.31 | 30.46 | 5.54 | 44.26 | 0.898 |
| 16 | CDR | 33.39 | 35.15 | 26.9 | 6.82 | 44.06 | 0.8922 |
| 17 | incred2 | 30.28 | 35.63 | 26.19 | 11.5 | 44.13 | 0.7467 |
| 18 | sample | 25.43 | 29.66 | 25.95 | 7.82 | 44.68 | 0.7432 |
| 19 | IntoTheBleu | 20.24 | 30.63 | 24.58 | 10.71 | 45.32 | 0.3814 |
| 20 | Balançoire | 12.49 | 24.17 | 20.2 | 4.78 | 46.43 | 0.1094 |
| 21 | Tête claque | 35.3 | 36.69 | 26.48 | 16.43 | 41.14 | 0.94 |
| | | 30.24818 | 32.965 | 28.81364 | 6.228182 | 44.41636 | 0.83535 |

TABLE 5

Results from the "Maximum bitrate" based rate controller

| | Sequence | PSNR | PSNRkept | PSNRmin | StdDev | kbps | total frms |
|---|---|---|---|---|---|---|---|
| 0 | Foreman | 25.74 | 27.61 | 25.34 | 4.21 | 41.41 | 0.8125 |
| 1 | Carphone | 28.5 | 29.18 | 26.04 | 3 | 41.07 | 0.8874 |
| 2 | Miss_am | 37.03 | 37.93 | 33.85 | 3.32 | 43.01 | 0.8933 |
| 3 | Grandma | 34.51 | 34.69 | 29.73 | 2.61 | 38.49 | 0.9701 |
| 4 | Claire | 36.55 | 36.71 | 31.14 | 3.29 | 39.39 | 0.9879 |
| 5 | Container | 31.1 | 31.61 | 28.02 | 2.53 | 37.29 | 0.9167 |
| 6 | News | 29.33 | 29.91 | 26.71 | 2.44 | 37.23 | 0.9033 |
| 7 | Mthr_dotr | 32.22 | 32.6 | 28.02 | 2.75 | 39.22 | 0.9578 |
| 8 | Salesman | 32.22 | 32.68 | 27.29 | 2.87 | 39.55 | 0.9465 |
| 9 | Silent | 30.73 | 31.04 | 28.51 | 2.6 | 39.85 | 0.9667 |
| 10 | Suzie | 31.68 | 32.78 | 30.09 | 3.61 | 43.17 | 0.8733 |
| 11 | Trevor | 28.25 | 31.07 | 26.14 | 6.11 | 42.77 | 0.7933 |
| 12 | Hall | 32.92 | 33.11 | 30.33 | 2.19 | 38.01 | 0.9788 |
| 13 | test (menu) | 32.48 | 32.81 | 28.92 | 2.99 | 42.14 | 0.9607 |
| 14 | incredibles | 30.52 | 36.03 | 26.63 | 12.55 | 39.6 | 0.7033 |
| 15 | building | 31.64 | 31.72 | 28.17 | 2.34 | 38.24 | 0.9915 |
| 16 | CDR | 33.06 | 34 | 26.95 | 5.59 | 38.98 | 0.9244 |
| 17 | incred2 | 31.06 | 34.71 | 26.49 | 9.82 | 40.37 | 0.7811 |
| 18 | sample | 26.07 | 29.65 | 26.25 | 6.26 | 42.32 | 0.7004 |
| 19 | IntoTheBleu | 22.89 | 31.95 | 24.27 | 11.14 | 42.11 | 0.4548 |
| 20 | Banançoire | 14.48 | 24.12 | 19.97 | 5.67 | 42.73 | 0.1875 |

TABLE 5-continued

Results from the "Maximum bitrate" based rate controller

| | | | Maximum bitrate | | | |
|---|---|---|---|---|---|---|
| Sequence | PSNR | PSNRkept | PSNRmin | StdDev | kbps | total frms |
| 21 Tête claque | 35.17 | 35.67 | 25.75 | 15.86 | 39.7 | 0.955 |
| | 30.37045 | 32.34455 | 27.48227 | 5.170455 | 40.30227 | 0.843014 |

TABLE 6

Results from the buffer-based with frame activity
rate controller, such as the device 42

| | | | Buffer-based with frame activity | | | |
|---|---|---|---|---|---|---|
| Sequence | PSNR | PSNRkept | PSNRmin | StdDev | kbps | total frms |
| 0 Foreman | 26.61 | 26.85 | 22.92 | 2.31 | 44.14 | 0.965 |
| 1 Carphone | 29.1 | 29.1 | 26.11 | 2.24 | 44.36 | 1 |
| 2 Miss_am | 38.56 | 38.56 | 36.95 | 0.86 | 44.43 | 1 |
| 3 Grandma | 35.83 | 35.83 | 33.78 | 1.11 | 44.06 | 1 |
| 4 Claire | 38.35 | 38.35 | 34.25 | 1 | 44.92 | 1 |
| 5 Container | 32.62 | 32.62 | 30.36 | 0.62 | 44.26 | 1 |
| 6 News | 31.4 | 31.4 | 29.11 | 1 | 44.16 | 1 |
| 7 Mthr_dotr | 33.14 | 33.14 | 28.97 | 1.34 | 44.06 | 1 |
| 8 Salesman | 33.34 | 33.34 | 30.06 | 0.91 | 44.12 | 1 |
| 9 Silent | 31.18 | 31.18 | 29.5 | 0.76 | 44.38 | 1 |
| 10 Suzie | 33.19 | 33.19 | 30.25 | 1.44 | 44.42 | 1 |
| 11 Trevor | 30.45 | 30.45 | 26.78 | 2.39 | 44.42 | 1 |
| 12 Hall | 33.4 | 33.4 | 32.04 | 0.67 | 44.25 | 1 |
| 13 test (menu) | 32.21 | 32.21 | 26.49 | 3.09 | 44.35 | 1 |
| 14 incredibles | 31.32 | 32.32 | 19.15 | 10.12 | 44.3 | 0.9378 |
| 15 building | 31.44 | 31.44 | 27.83 | 1.37 | 44.17 | 1 |
| 16 CDR | 34.62 | 34.62 | 27.02 | 3.94 | 44.02 | 1 |
| 17 incred2 | 31.75 | 32.3 | 20.26 | 8.07 | 44.53 | 0.9578 |
| 18 sample | 27.71 | 28.35 | 24.17 | 3.41 | 48.53 | 0.93 |
| 19 IntoTheBleu | 23.81 | 28.05 | 20.16 | 8.45 | 47.05 | 0.6479 |
| 20 Balançoire | 17.64 | 18.43 | 16.05 | 4.53 | 48.92 | 0.7266 |
| 21 Tête claque | 35.66 | 35.66 | 25.73 | 15.72 | 42.88 | 1 |
| | 31.515 | 31.85409 | 27.17909 | 3.425 | 44.76045 | 0.96205 |

Analysis of the Results of Test Case 2

Looking at the PSNR for the three rate controllers, it can be seen that the performance of the buffer-based rate control device 42 and method 100 according to the non-restrictive illustrative embodiment of the present invention is higher than the TMN8 and "Maximum bitrate" rate controllers:

| | |
|---|---|
| TMN8: | 30.25 dB |
| "Maximum bitrate": | 0.37 dB |
| Buffer-based with frame activity: | 31.52 dB |

Regarding the percentage of remaining frames (not dropped), the results are:

| | |
|---|---|
| TMN8: | 83.5% |
| "Maximum bitrate": | 84.3% |
| Buffer-based with frame activity: | 96.2% |

Those results show again the higher performance of the buffer-based rate control device 42 and method 100 according to the non-restrictive illustrative embodiment of the present invention compared to the two other rate controllers in terms of the ability of keeping most of the frames. Those results are best illustrated with the example of the sequence 20, where the remaining frames are given by:

| | |
|---|---|
| TMN8: | 10.9% |
| "Maximum bitrate": | 18.8% |
| Buffer-based with frame activity: | 72.7% |

It should be noted that in this case where the bitrate is low, a compromise should be established between having a fewer number of frames of better quality and having a larger number of frames with lower quality. This compromise can be implemented and tuned in the buffer-based rate control device 42 and method 100 according to the non-restrictive illustrative embodiment of the present invention.

Test Case 3:

In the third case, the video sequences were encoded with a bitrate of $R_{MAX}$=96 kbps, F=10 fps (input and output of the encoder 14) and T=8 s (between two Intra frames). The results of the tests are given below.

TABLE 7

Results from the TMN8 standard rate controller

| | | | TMN8 standard | | | |
|---|---|---|---|---|---|---|
| | Sequence | PSNR | PSNRkept | PSNRmin | StdDev | kbps | total frms |
| 0 | Foreman | 34.06 | 34.2 | 31.04 | 2.02 | 96.16 | 0.99 |
| 1 | Carphone | 36.08 | 36.19 | 31.82 | 2.61 | 96.12 | 0.9895 |
| 2 | Miss_am | 43.18 | 43.18 | 37.81 | 0.77 | 96.14 | 1 |
| 3 | Grandma | 41.09 | 41.1 | 33.63 | 1.76 | 96.11 | 0.9989 |
| 4 | Claire | 43.89 | 43.89 | 37.28 | 1.1 | 96.2 | 1 |
| 5 | Container | 39.67 | 39.77 | 33.78 | 1.35 | 96.25 | 0.9833 |
| 6 | News | 40.33 | 40.6 | 33.51 | 2.98 | 96.37 | 0.9833 |
| 7 | Mthr_dotr | 38.97 | 38.98 | 33.52 | 1.52 | 96.1 | 0.9989 |
| 8 | Salesman | 40.2 | 40.25 | 32.38 | 2.01 | 96.25 | 0.9889 |
| 9 | Silent | 39.83 | 39.98 | 32.92 | 2.35 | 96.37 | 0.99 |
| 10 | Suzie | 39.34 | 39.34 | 34.62 | 0.87 | 96.35 | 1 |
| 11 | Trevor | 38.35 | 38.35 | 31.52 | 2.59 | 96.72 | 1 |
| 12 | Hall | 39.97 | 40.06 | 34.04 | 1.47 | 96.21 | 0.9879 |
| 13 | test (menu) | 42.83 | 43.69 | 32.82 | 5.61 | 96.62 | 0.9551 |
| 14 | incredibles | 46.12 | 46.16 | 29.5 | 10.68 | 87.94 | 0.9989 |
| 15 | building | 37.66 | 37.81 | 31.1 | 2.59 | 96.31 | 0.9745 |
| 16 | CDR | 43.61 | 43.61 | 28.51 | 3.74 | 95.67 | 0.9989 |
| 17 | incred2 | 42.6 | 42.6 | 28.91 | 7.66 | 90.23 | 1 |
| 18 | sample | 35.6 | 35.6 | 30.05 | 2.36 | 95.49 | 1 |
| 19 | IntoTheBleu | 35.87 | 36.12 | 26.42 | 6.47 | 93.39 | 0.9902 |
| 20 | Balançoire | 22.13 | 23.2 | 20.43 | 5.27 | 95.44 | 0.9023 |
| 21 | Tête claque | 45.14 | 45.26 | 31.97 | 13.6 | 90.93 | 0.99 |
| | | 39.38727 | 39.54273 | 31.70818 | 3.699091 | 95.15318 | 0.9873 |

TABLE 8

Results from the "Maximum bitrate" based rate controller

| | | | Maximum bitrate | | | |
|---|---|---|---|---|---|---|
| | Sequence | PSNR | PSNRkept | PSNRmin | StdDev | kbps | total frms |
| 0 | Foreman | 33.73 | 33.87 | 29.43 | 2.01 | 89.89 | 0.985 |
| 1 | Carphone | 35.55 | 35.68 | 28.45 | 2.73 | 90.17 | 0.9843 |
| 2 | Miss_am | 42.79 | 42.86 | 35.34 | 1.32 | 92.45 | 0.9933 |
| 3 | Grandma | 40.9 | 40.94 | 30.44 | 2.1 | 90.14 | 0.9828 |
| 4 | Claire | 43.52 | 43.65 | 32.67 | 1.87 | 89.2 | 0.9777 |
| 5 | Container | 39.42 | 39.44 | 30.85 | 1.43 | 91.01 | 0.99 |
| 6 | News | 39.65 | 39.79 | 27.68 | 3.28 | 90.9 | 0.9867 |
| 7 | Mthr_dotr | 38.58 | 38.63 | 30.09 | 1.89 | 90.24 | 0.9867 |
| 8 | Salesman | 39.94 | 39.95 | 28.15 | 2.53 | 90.99 | 0.9889 |
| 9 | Silent | 39.39 | 39.57 | 30.17 | 2.49 | 89.39 | 0.98 |
| 10 | Suzie | 38.97 | 39.04 | 31.92 | 1.57 | 92.29 | 0.9933 |
| 11 | Trevor | 37.85 | 37.9 | 29.66 | 3.17 | 92.36 | 0.9933 |
| 12 | Hall | 39.85 | 39.89 | 32.07 | 1.4 | 90.44 | 0.9879 |
| 13 | test (menu) | 42.89 | 42.96 | 29.93 | 3.71 | 90.17 | 0.9888 |
| 14 | incredibles | 45.2 | 45.33 | 27.26 | 11.07 | 81.45 | 0.9933 |
| 15 | building | 37.54 | 37.58 | 27.99 | 2.31 | 89.25 | 0.9802 |
| 16 | CDR | 43.13 | 43.22 | 28.26 | 4.18 | 88.99 | 0.9833 |
| 17 | incred2 | 41.84 | 42.03 | 27.44 | 8 | 84.37 | 0.9878 |
| 18 | sample | 34.95 | 35.11 | 28.74 | 2.81 | 88.99 | 0.9844 |
| 19 | IntoTheBleu | 35.29 | 35.75 | 26.26 | 7.26 | 86.78 | 0.9731 |
| 20 | Balançoire | 21.99 | 23.03 | 19.96 | 4.7 | 86.67 | 0.8711 |
| 21 | Tête claque | 44.58 | 44.92 | 30.56 | 13.86 | 84.04 | 0.975 |
| | | 38.97955 | 39.14273 | 29.24182 | 3.895 | 89.09909 | 0.980314 |

TABLE 9

Results from the buffer-based rate controller with frame activity, such as device 42

| | | | Buffer-based with frame activity | | | |
|---|---|---|---|---|---|---|
| | Sequence | PSNR | PSNRkept | PSNRmin | StdDev | kbps | total frms |
| 0 | Foreman | 34.13 | 34.13 | 30.19 | 1.52 | 95.97 | 1 |
| 1 | Carphone | 36.14 | 36.14 | 32.08 | 2.43 | 95.96 | 1 |
| 2 | Miss_am | 43.16 | 43.16 | 40.91 | 0.73 | 96.31 | 1 |

TABLE 9-continued

Results from the buffer-based rate controller with frame activity, such as device 42

Buffer-based with frame activity

| Sequence | PSNR | PSNRkept | PSNRmin | StdDev | kbps | total frms |
|---|---|---|---|---|---|---|
| 3 Grandma | 42.03 | 42.03 | 40 | 1.09 | 96.05 | 1 |
| 4 Claire | 44.11 | 44.11 | 38.72 | 0.95 | 96.09 | 1 |
| 5 Container | 39.98 | 39.98 | 35.58 | 0.6 | 96.16 | 1 |
| 6 News | 40.82 | 40.82 | 36.99 | 1.52 | 96.15 | 1 |
| 7 Mthr_dotr | 39.18 | 39.18 | 36.03 | 1.39 | 96.04 | 1 |
| 8 Salesman | 40.83 | 40.91 | 35.77 | 1.78 | 95.49 | 0.9889 |
| 9 Silent | 40.36 | 40.36 | 37.96 | 1.07 | 96.15 | 1 |
| 10 Suzie | 39.42 | 39.42 | 37.02 | 0.85 | 96.31 | 1 |
| 11 Trevor | 38.38 | 38.38 | 31.49 | 2.43 | 96.31 | 1 |
| 12 Hall | 40.34 | 40.34 | 38.14 | 0.52 | 96.34 | 1 |
| 13 test (menu) | 43.38 | 43.38 | 33.2 | 2.96 | 96.26 | 1 |
| 14 incredibles | 46.25 | 46.25 | 27.26 | 10.98 | 90.72 | 1 |
| 15 building | 38.14 | 38.14 | 33.16 | 1.1 | 96.12 | 1 |
| 16 CDR | 44.06 | 44.06 | 31.86 | 3.16 | 96 | 1 |
| 17 incred2 | 42.34 | 42.34 | 31.54 | 7.51 | 90.99 | 1 |
| 18 sample | 35.61 | 35.61 | 29.57 | 2.55 | 97.21 | 1 |
| 19 IntoTheBleu | 36.06 | 36.06 | 25.82 | 6.04 | 95.13 | 1 |
| 20 Balançoire | 22.94 | 22.94 | 20.3 | 4.23 | 97.69 | 1 |
| 21 Tête claque | 45.39 | 45.4 | 31.72 | 13.43 | 91.05 | 0.995 |
|  | 39.68409 | 39.68818 | 33.42318 | 3.129091 | 95.47727 | 0.999268 |

Analysis of the Results of Test Case 3

In terms of overall PSNR, it can be seen that the three (3) types of rate controllers perform well, however, a small improvement can be observed in the buffer-based rate control device 42 and method 100 according to the non-restrictive illustrative embodiment of the present invention. Indeed, the results are as follows:

| TMN8: | 39.39 dB |
|---|---|
| "Maximum bitrate": | 38.98 dB |
| Buffer-based with frame activity: | 39.68 dB |

Regarding the percentage of remaining frames (i.e. the frames which are not dropped), it can be seen that the buffer-based rate controller with frame activity shows an improved performance:

| TMN8: | 98.7% |
|---|---|
| "Maximum bitrate": | 98.0% |
| Buffer-based with frame activity: | 99.9% |

It can be clearly seen from the test results that the buffer-based rate control device 42 and method 100 according to the non-restrictive illustrative embodiment of the present invention shows improvement over the two (2) other rate controllers.

VI. Software Structure

The buffer-based rate control device 42 and method 100 according to the non-restrictive illustrative embodiment of the present invention has been implemented in a computer program, placed in a memory medium of a computer.

The encoder 14 has been modified so as to modularize the rate control operations, thus creating a new framework for rate controlling implementation and testing.

More specifically, a plurality of features has been added to the rate control framework. For example, for product development and debugging, the following features have been used:
 computation of PSNR between original and encoded frames: 1) if a frame is skipped, the last reconstructed image is used in the computation, and 2) a file for the reconstructed image is generated in YUV (a color space with luminance and chrominance); and
 computation and writing into a file of the statistics, such as QP, PSNR, MAD, etc.

Also, the buffer-based rate control device 42 and method 100 according to the non-restrictive illustrative embodiment of the present invention can detect scene cuts. For that purpose, the computation of the motion estimation is performed prior to the frame type determination. Detecting scene cuts can be made by comparing the MAD to a fixed threshold or to the average MAD (adaptive threshold). If the MAD is greater than the fixed or adaptive threshold, a scene cut is detected and the frame is coded as an Intra frame.

Furthermore, for the calculation of the Intra frame target size, two options are possible: 1) determining a constant QP for the duration of the whole frame or 2) determining and updating QP which may change for each MB line. A constant QP during the whole frame helps maintaining a quality consistency throughout the frame.

Many statistics concerning the QPs, encoded frame sizes, etc. can be collected and then analyzed for further improvements or processing.

As mentioned hereinabove, the frame complexity metrics MAD and $MAD_A$ can be used in the rate control device 42 and method 100. By default, the computer program uses MAD because it leads to fewer computations compared to $MAD_A$. However, it is possible to use $MAD_A$ if desired. To do so, it is sufficient to define $MAD_A$ in the computer program, before compiling it.

Furthermore, the feature of support of GOB (Group Of Blocks) has been added.

It should be noted that the cases where the number of frames per second is below one (1) may lead to surprising results at first. Indeed, having the maximum bitrate $R_{MAX}$ equal to the average bitrate $R_{AVG}$ will lead to a bitrate much smaller than $R_{MAX}$. For example, if F=0.1 fps, and the maximum buffer size is $R_{MAX}$, then the largest frame size can be $R_{MAX}$. Since only one frame per every 10 seconds is transmitted, then the effective bitrate will be close to 0.1 $R_{MAX}$. If a person wants a higher bitrate, then the maximum bitrate should be set to a higher bitrate.

Since the buffer-based rate control device 42 and method 100 according to the non-restrictive illustrative embodiment of the present invention has been implemented in a computer program, it can be observed that the speed of the program can be improved through optimization. Even though more statistics have to be computed in the implemented buffer-based rate control device exploiting frame complexity, optimization implemented in the different modules of the program allows for speeding up the buffer-based rate controlling method 100. Also, if any further improvement on speed is required, then the use of Intel® IPP (Integrated Performance Primitives) for the computations can be considered for certain computing platforms.

Although the present invention has been described in the foregoing specification by means of a non-restrictive illustrative embodiment, this illustrative embodiment can be modified at will within the scope of the appended claims without departing from the spirit and nature of the subject invention.

What is claimed is:

1. A method of controlling bitrate in video coding of a sequence of images, including a series of coded frames, Inter frames separated by Intra frames, the method comprising:
   (a) measuring frame complexity in the sequence of images;
   (b) for each Inter frame,
      (i) calculating a target buffer level of a video buffering device in relation to a distance between the Inter frame and a next Intra frame;
      (ii) calculating a target frame size in relation to the measured frame complexity, a current buffer level of the video buffering device and the calculated target buffer level, comprising:
      provided the current buffer level exceeds the calculated target buffer level;
         more aggressively reducing, as each Inter frame gets closer to the next Intra frame, the calculated target frame size;
         further reducing the calculated target frame size in such a manner that the larger is a maximum size limit of the video buffering device compared to the calculated target buffer level, the smaller is the further reducing of the target frame size; and
   (c) using the calculated target frame size of the Inter frame to control bitrate in video coding of the sequence of images.

2. The method of claim 1, further comprising calculating a target frame size of an Intra frame in relation to the maximum size limit of the video buffering device; and the step (c) comprising using the calculated target frame size of the Inter frame and the calculated target frame size of the Intra frame to control bitrate in video coding of the sequence of images.

3. The method of claim 2, wherein the calculating the target frame size of the Intra frame comprises determining quantization parameters and using the quantization parameters to determine the target frame size of the Intra frame.

4. The method of claim 3, wherein the calculating the target frame size of the Intra frame comprises determining a smallest frame size for which the quantization parameters are smaller or equal to an average of quantization parameters of previously encoded frames over a given period of time.

5. The method of claim 2, the step (c) comprising using the target frame size of the Inter frame, or the target frame size of the Inter frame and the target frame size of the Intra frame, to satisfy an average bitrate without exceeding the maximum size limit of the video buffering device.

6. The method of claim 5, wherein the calculating the target buffer level of the video buffering device comprises one or more of the following:
   (i) in relation to the average bitrate and a buffer level of the video buffering device after coding of a last Intra frame; or
   (ii) in relation to the average bitrate and the maximum size limit of the video buffering device; or
   (iii) in relation to the average bitrate and a high buffer level of the video buffering device, which may lead to overflow of the video buffering device.

7. The method of claim 2, further comprising validating the coded frames in a video buffering device prior to transmission of the coded frames, comprising validating the determined target frame size for Inter and Intra frames to avoid overflow of the video buffering device and avoiding underflow of the video buffering device.

8. The method of claim 1, the step (a) comprising measuring frame complexity of the Inter frame, including determining a metrics representative of a difference between a current image and a previous reconstructed image in the sequence of images.

9. The method of claim 8, wherein the measuring frame complexity of the Inter frame frame comprises determining the metrics for the Inter frame as a mean absolute difference; and the measuring frame complexity of the Intra frame comprises determining the metrics for the Inter frame as a mean absolute difference, including setting the previous reconstructed image to zero.

10. The method of claim 1, further comprising dropping coded frames provided a size of a coded frame exceeds a maximum value permissible to avoid overflow of the video buffering device, and restoring state variables of an encoder performing the video coding after dropping the coded frame.

11. The method of claim 1, further comprising determining how close the calculated target buffer level approaches the maximum size limit of the video buffering device.

12. The method of claim 1, wherein the reducing being further a function of a maximum size limit of the video buffering device and the calculated target buffer level.

13. The method of claim 12, wherein the function comprises a multiplicative reduction factor depending on the maximum size limit of the video buffering device and the calculated target buffer level.

14. The method of claim 1, wherein step (b)(ii) further comprises:
   provided the current buffer level exceeds the calculated target buffer level, further reducing the calculated target frame size by a reduction factor in such a manner that the larger is the maximum size limit of the video buffering device compared to the calculated target buffer level, the smaller is the reduction induced by the reduction factor on the target frame size.

15. The method of claim 1, wherein the reducing comprises reducing by a reduction multiplicative factor.

16. A device for controlling bitrate in video coding of a sequence of images, including a series of coded frames, Inter frames separated by Intra frames, the device comprising:
   a non-transitory computer readable storage medium having computer executable program code stored thereon, for execution by a processor, causing the processor to:
      (a) measure a frame complexity in the sequence of images;
      (b) calculate a target buffer level of the video buffering device, for each Inter frame, in relation to a distance between the Inter frame and a next Intra frame;
      (c) calculate a target frame size, for each Inter frame, in relation to the measured frame complexity, a current buffer level of the video buffering device and the calculated target buffer level, comprising:

provided the current buffer level exceeds the calculated target buffer level:

more aggressively reducing, as each Inter frame gets closer to the next Intra frame, the calculated target frame size;

further reducing the calculated target frame size in such a manner that the larger is a maximum size limit of the video buffering device compared to the calculated target buffer level, the smaller is the further reducing of the target frame size; and (d) control the bitrate in video coding of the sequence of images in response to the calculated target frame size.

17. The device of claim 16, wherein the computer executable program code further causes the processor to:

(e) determine the target buffer level of the video buffering device in relation to the average bitrate and a buffer level of the video buffering device after coding of a last Intra frame; or (f) determine the target buffer level of the video buffering device in relation to the average bitrate and the maximum size limit of the video buffering device; or (g) determine the target frame size of the Inter frame in relation to the average bitrate and a high buffer level of the video buffering device, which may lead to overflow of the video buffering device; or (h) determine a target frame size of an Intra frame in relation to the maximum size limit of the video buffering device; or (i) validate the calculated target frame size for the Inter frame.

18. The device of claim 17, wherein the computer executable program code further causes the processor to determine quantization parameters and to use the quantization parameters for determining the target frame size of the Intra frame.

19. The device of claim 16, wherein the computer executable program code further causes the processor to:

(j) determine metrics representative of a difference between a current image and a previous reconstructed image for the Inter frame or the Intra frame; or (k) using the target frame size of the Inter frame, or the target size of the Inter frame and the Intra frame, obtain an average bitrate without exceeding the maximum size limit of the video buffering device; or (l1) avoid overflow of the video buffering device;

(l2) avoid underflow of the video buffering device;

(l3) drop a coded frame when a size of the coded frame is larger than a maximum value permissible to avoid overflow of the video buffering device.

20. The device of claim 19, wherein:

(m) for the Inter frame, the metrics is a mean absolute difference; or (n) for the Intra frame, the metrics is a mean absolute difference, and the previous reconstructed image is set to zero.

21. The device of claim 16, further being configured to determine how close the calculated target buffer level approaches the maximum size limit of the video buffering device.

22. The device of claim 16, wherein the reducing being further a function of the maximum size limit of the video buffering device and the calculated target buffer level.

23. An encoder for video coding, comprising:
a processor; and
a device for rate controlling in the video coding, comprising:
a non-transitory computer readable storage medium having computer executable
program code stored thereon, for execution by the processor, causing the processor to:
(a) measure a frame complexity in the sequence of images;
(b) calculate a target buffer level of a video buffering device, for each Inter frame, in relation to a distance between the Inter frame and a next Intra frame;
(c) calculate a target frame size, for each Inter frame, in relation to the measured frame complexity, a current buffer level of the video buffering device and the calculated target buffer level, comprising:
provided the current buffer level exceeds the calculated target buffer level;
more aggressively reducing, as each Inter frame gets closer to the next Intra frame, the calculated target frame size;
further reducing the calculated target frame size in such a manner that the larger is a maximum size limit of the video buffering device compared to the calculated target buffer level, the smaller is the further reducing of the target frame size; and
(d) control the bitrate in video coding of the sequence of images in response to the calculated target frame size.

24. The encoder of claim 23, further being configured to determine how close the calculated target buffer level approaches the maximum size limit of the video buffering device.

25. The encoder of claim 23, wherein the reducing being further a function of the maximum size limit of the video buffering device and the calculated target buffer level.

* * * * *

UNITED STATES PATENT AND TRADEMARK OFFICE
CERTIFICATE OF CORRECTION

PATENT NO.         : 8,824,546 B2                                                Page 1 of 1
APPLICATION NO.    : 12/601267
DATED              : September 2, 2014
INVENTOR(S)        : Stephane Coulombe et al.

It is certified that error appears in the above-identified patent and that said Letters Patent is hereby corrected as shown below:

In the Claims

Column 32, line 21, delete the first instance of the word "frame".

Signed and Sealed this
Twenty-fifth Day of November, 2014

Michelle K. Lee
*Deputy Director of the United States Patent and Trademark Office*